（12）United States Patent
Shoshan

(10) Patent No.: US 8,847,123 B2
(45) Date of Patent: *Sep. 30, 2014

(54) ASSEMBLY FOR COOKING ELONGATED FOOD PRODUCTS

(71) Applicant: Marc Shoshan, Hallandale, FL (US)

(72) Inventor: Marc Shoshan, Hallandale, FL (US)

(73) Assignee: Kedem LLC, Hallandale, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/080,956

(22) Filed: Nov. 15, 2013

(65) Prior Publication Data

US 2014/0102317 A1 Apr. 17, 2014

Related U.S. Application Data

(63) Continuation of application No. 12/803,942, filed on Jul. 9, 2010, now Pat. No. 8,596,189, which is a continuation-in-part of application No. 12/228,216, filed on Aug. 11, 2008, now abandoned.

(51) Int. Cl.

| | | |
|---|---|---|
| H05B 3/06 | (2006.01) | |
| A21D 13/00 | (2006.01) | |
| A23P 1/10 | (2006.01) | |
| A47J 37/04 | (2006.01) | |
| A23L 1/322 | (2006.01) | |
| A47J 43/20 | (2006.01) | |
| A23L 1/48 | (2006.01) | |
| A23L 1/317 | (2006.01) | |
| A23L 1/31 | (2006.01) | |

(52) U.S. Cl.
CPC ............. *A47J 43/20* (2013.01); *A21D 13/0029* (2013.01); *A23P 1/105* (2013.01); *A21D 13/0025* (2013.01); *A47J 37/04* (2013.01); *A23L 1/322* (2013.01); *A21D 13/0077* (2013.01); *A23L 1/48* (2013.01); *A23L 1/3177* (2013.01); *A23L 1/3103* (2013.01)

USPC .......................................... 219/520

(58) Field of Classification Search
CPC ............. A21B 5/08; A21B 7/00; A47J 37/06; A47J 37/08; A47J 37/12; A22C 7/00; H05B 3/06; H05B 3/18; H05B 3/40
USPC .................... 99/348–354, 410, 426, 427, 441; 219/520

See application file for complete search history.

(56) References Cited

U.S. PATENT DOCUMENTS

| 282,244 A | 7/1883 | Vernon |
|---|---|---|
| 474,398 A | 5/1892 | Mitchell |

(Continued)

FOREIGN PATENT DOCUMENTS

| DE | 1 817 009 | 7/1970 |
|---|---|---|
| EP | 2074886 | 7/2009 |

(Continued)

*Primary Examiner* — Brian Jennison

(74) *Attorney, Agent, or Firm* — Malloy & Malloy, P.L.

(57) ABSTRACT

An assembly for cooking food products in a substantially upright orientation comprising a mold housing including one or more food mold chambers, each structured to configure the food product being cooked to correspond to the interior dimensions and configuration of a mold chamber in which it was cooked. Each mold chamber is further structured to retain an uncooked liquid, semi-liquid, semi-solid, or solid food composition therein during the cooking procedure. A heat source is disposed either externally or internally of the mold housing and generates sufficient heat to cook a food composition disposed within the mold chamber. A frame assembly may be utilized to operatively support one or more mold housing in the substantially upright orientation, such that a heat source may be incorporated into the frame assembly to provide adequate cooking temperatures to the corresponding mold chamber(s) of one or more supported mold housings.

15 Claims, 29 Drawing Sheets

(56) References Cited

U.S. PATENT DOCUMENTS

| | | | |
|---|---|---|---|
| 887,024 A | 5/1908 | Anderson et al. |
| 965,462 A | 7/1910 | How |
| 1,150,211 A | 8/1915 | Lawhead |
| 1,547,614 A | 7/1925 | Sawkins |
| 1,591,945 A | 7/1926 | Sawkins |
| 1,692,547 A | 11/1928 | Evans |
| 1,915,962 A | 6/1933 | Vaughn |
| 1,950,772 A | 3/1934 | Biggs |
| 1,957,865 A | 5/1934 | Ueding, Jr. |
| 2,011,869 A | 8/1935 | Pecker |
| 2,118,976 A | 5/1938 | Larkin |
| 2,125,589 A | 8/1938 | Shuman |
| 2,153,256 A | 4/1939 | Kovensky |
| 2,425,199 A | 8/1947 | Navon |
| 2,572,695 A | 10/1951 | Briscoe et al. |
| 2,856,507 A | 10/1958 | Naxon |
| D189,374 S | 11/1960 | Harris |
| D189,393 S | 12/1960 | Schlumbohm |
| 3,180,155 A | 4/1965 | Wickenberg et al. |
| 3,289,570 A | 12/1966 | Smith |
| 3,294,039 A | 12/1966 | Ogden |
| 3,301,169 A | 1/1967 | Young |
| 3,313,230 A | 4/1967 | Simjian |
| 3,374,728 A | 3/1968 | Owens |
| 3,505,948 A | 4/1970 | Carre et al. |
| 3,588,470 A | 6/1971 | Husband |
| 3,656,968 A | 4/1972 | Allen |
| 3,669,002 A | 6/1972 | Davidson |
| 3,772,500 A | 11/1973 | Thibault |
| 3,792,653 A | 2/1974 | Davidson |
| 3,940,589 A | 2/1976 | Tupper |
| 3,955,487 A | 5/1976 | Chetta, Jr. |
| 3,978,238 A | 8/1976 | Frey et al. |
| 4,068,570 A | 1/1978 | Lanoie |
| D247,945 S | 5/1978 | Saunders |
| 4,102,256 A | 7/1978 | John et al. |
| 4,103,147 A | 7/1978 | Carvalho |
| 4,212,234 A | 7/1980 | DeCourcy |
| 4,217,817 A | 8/1980 | Meamber |
| 4,241,650 A | 12/1980 | John et al. |
| 4,313,051 A | 1/1982 | Aoshima |
| 4,364,308 A | 12/1982 | John et al. |
| 4,512,250 A | 4/1985 | Schindler |
| 4,790,740 A | 12/1988 | Pearlman |
| 4,817,513 A | 4/1989 | Carbon et al. |
| 4,825,665 A | 5/1989 | Micallef |
| 4,903,589 A | 2/1990 | Aoyama |
| 4,966,781 A | 10/1990 | Artzer |
| 4,970,949 A | 11/1990 | Ferrara et al. |
| 5,019,680 A | 5/1991 | Morino et al. |
| D320,910 S | 10/1991 | Saiki |
| 5,251,542 A | 10/1993 | Itoh et al. |
| 5,280,150 A | 1/1994 | Arai et al. |
| 5,355,778 A | 10/1994 | Mayfield et al. |
| 5,359,924 A | 11/1994 | Roberts et al. |
| 5,445,061 A | 8/1995 | Barradas |
| 5,450,785 A | 9/1995 | Westbrooks |
| D368,414 S | 4/1996 | VanHalteren et al. |
| 5,510,127 A | 4/1996 | Wong et al. |
| 5,528,981 A | 6/1996 | Pettit |
| 5,712,466 A | 1/1998 | Spicer |
| 5,727,450 A | 3/1998 | Vassiliou |
| D395,208 S | 6/1998 | VanHalteren et al. |
| 5,794,520 A * | 8/1998 | Hefford .................. 99/323.3 |
| 5,890,421 A | 4/1999 | Smith-Berry et al. |
| 5,992,302 A | 11/1999 | Geisler |
| 6,026,734 A | 2/2000 | Dadez |
| D428,300 S | 7/2000 | Dadez |
| 6,121,585 A | 9/2000 | Dam |
| 6,177,663 B1 | 1/2001 | Kula |
| 6,213,003 B1 | 4/2001 | Dufournet |
| D445,030 S | 7/2001 | Croft et al. |
| D447,693 S | 9/2001 | Warner et al. |
| 6,284,301 B1 | 9/2001 | Garbo |
| D455,324 S | 4/2002 | Wright |
| 6,530,232 B1 | 3/2003 | Kitchens |
| D484,371 S | 12/2003 | Tang et al. |
| 6,674,052 B1 * | 1/2004 | Luo .......................... 219/520 |
| 6,736,051 B2 | 5/2004 | Frantz et al. |
| 6,783,784 B2 | 8/2004 | Skene et al. |
| 6,805,312 B2 | 10/2004 | Capp |
| D504,286 S | 4/2005 | de Cleir |
| D518,994 S | 4/2006 | Lin |
| D522,318 S | 6/2006 | McGuyer |
| D537,684 S | 3/2007 | Lee |
| 7,241,469 B2 | 7/2007 | Mathews |
| D548,023 S | 8/2007 | Seidenfaden |
| D549,043 S | 8/2007 | Beesley et al. |
| D550,028 S | 9/2007 | Abed et al. |
| D550,506 S | 9/2007 | Spitzer |
| D560,445 S | 1/2008 | Tardif et al. |
| D567,598 S | 4/2008 | Lee |
| D580,702 S | 11/2008 | Holcomb et al. |
| D581,226 S | 11/2008 | Kestenbaum |
| D581,742 S | 12/2008 | Krus et al. |
| D581,750 S | 12/2008 | de Groote |
| D582,278 S | 12/2008 | Bourne |
| D584,107 S | 1/2009 | George |
| D593,365 S | 6/2009 | Miller et al. |
| D598,739 S | 8/2009 | Jimenez et al. |
| D603,215 S | 11/2009 | Hollinger |
| D606,364 S | 12/2009 | Gilbert et al. |
| D608,163 S | 1/2010 | Park |
| D610,882 S | 3/2010 | Jossem et al. |
| D616,261 S | 5/2010 | Lundström |
| D616,262 S | 5/2010 | Lundstrom |
| D616,304 S | 5/2010 | Prunier et al. |
| D618,062 S | 6/2010 | Jossem et al. |
| 7,806,354 B2 | 10/2010 | de Groote et al. |
| D640,084 S | 6/2011 | Sheppard et al. |
| D642,852 S | 8/2011 | Sheppard et al. |
| D642,859 S | 8/2011 | Cozzolino et al. |
| D646,521 S | 10/2011 | Collinson |
| D646,932 S | 10/2011 | Melms, Jr. |
| D653,112 S | 1/2012 | White et al. |
| D659,461 S | 5/2012 | Borovicka et al. |
| 8,268,374 B2 | 9/2012 | Capodieci |
| D669,304 S | 10/2012 | Bock et al. |
| D683,239 S | 5/2013 | Broen et al. |
| D685,638 S | 7/2013 | DeMarco |
| 2002/0117566 A1 | 8/2002 | Cheng |
| 2005/0235838 A1 | 10/2005 | Cohn |
| 2007/0210062 A1 | 9/2007 | Gaynor et al. |
| 2008/0041237 A1 * | 2/2008 | Bonsell ........................ 99/328 |
| 2008/0206437 A1 | 8/2008 | Perry |

FOREIGN PATENT DOCUMENTS

| | | |
|---|---|---|
| FR | 2 405 679 | 5/1979 |
| GB | 2 114 428 A | 8/1983 |
| GB | 2 231 486 A | 11/1990 |

* cited by examiner

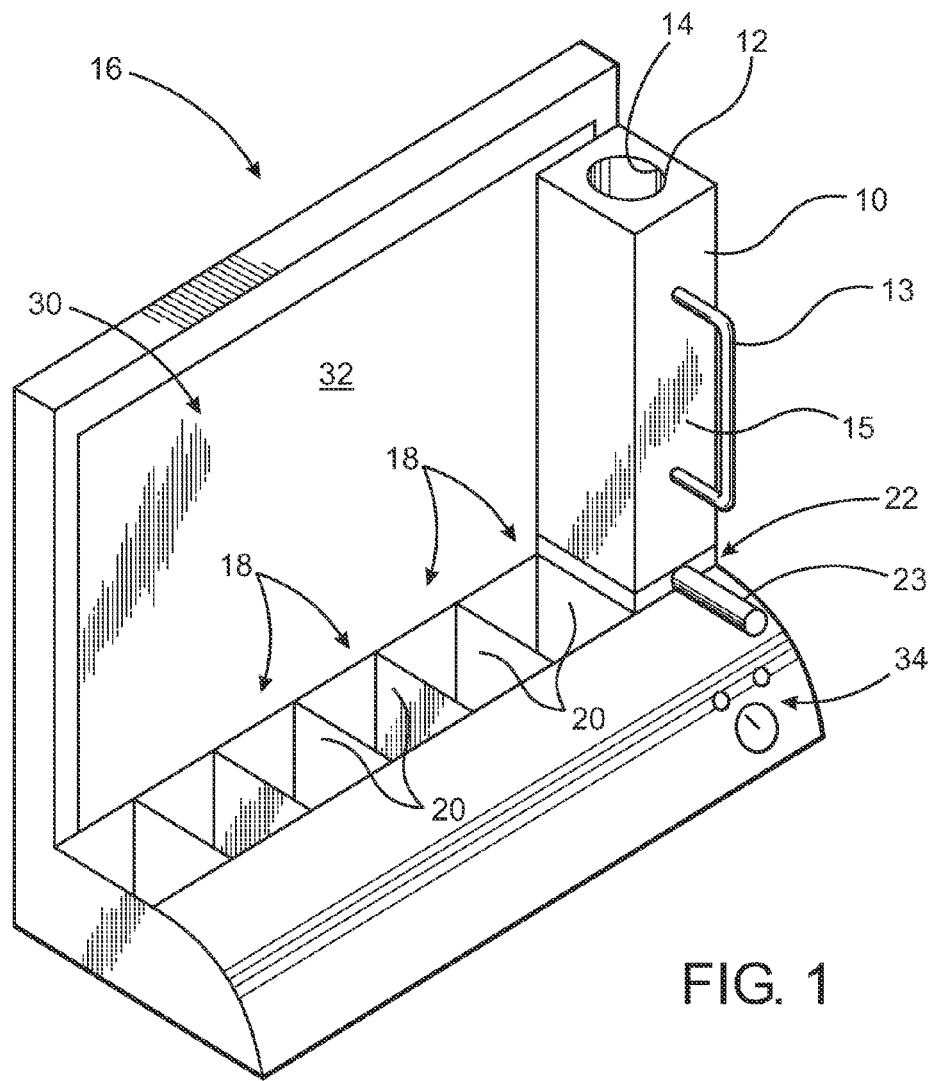
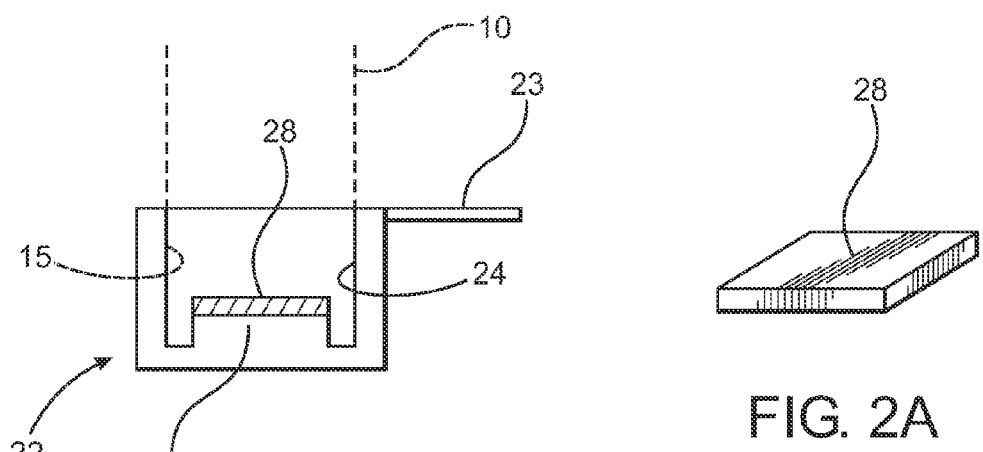
FIG. 1
FIG. 2
FIG. 2A

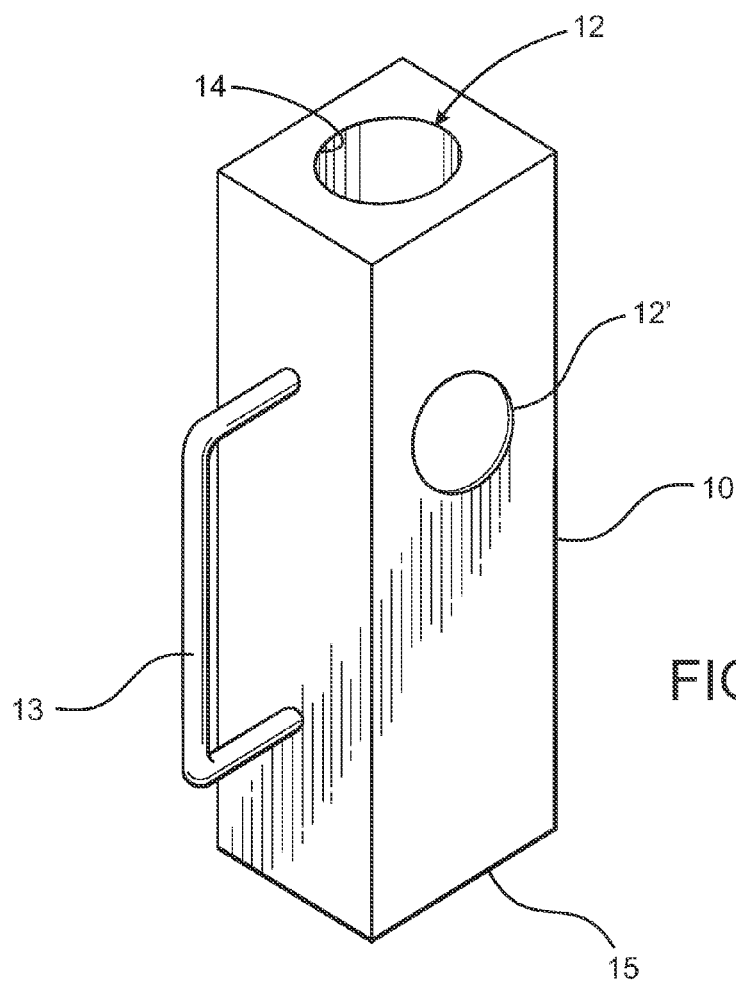
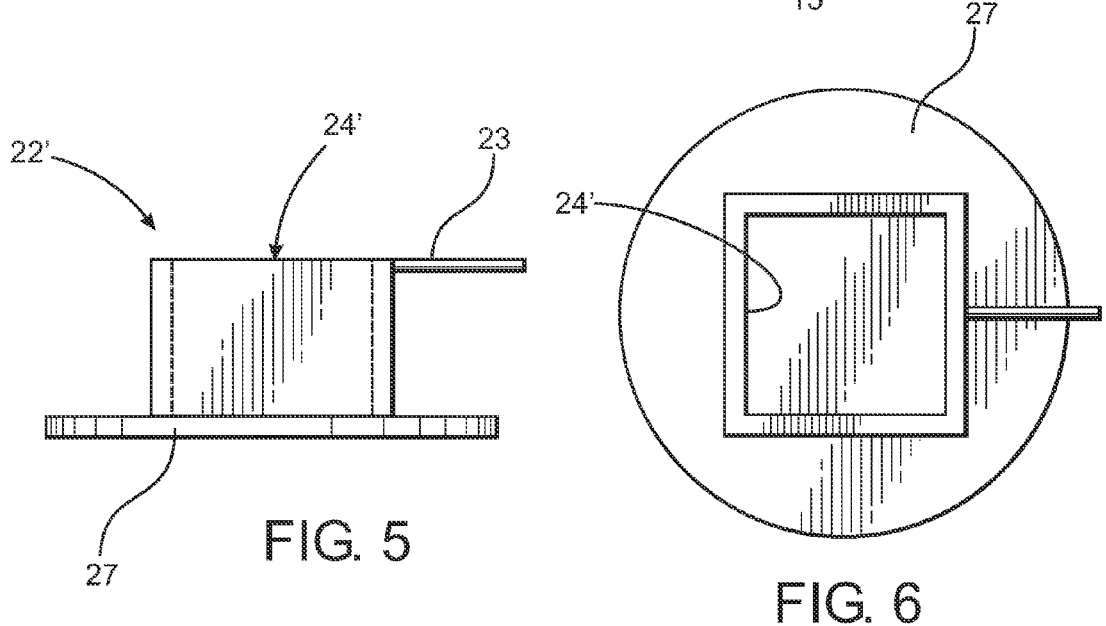
FIG. 4
FIG. 5
FIG. 6

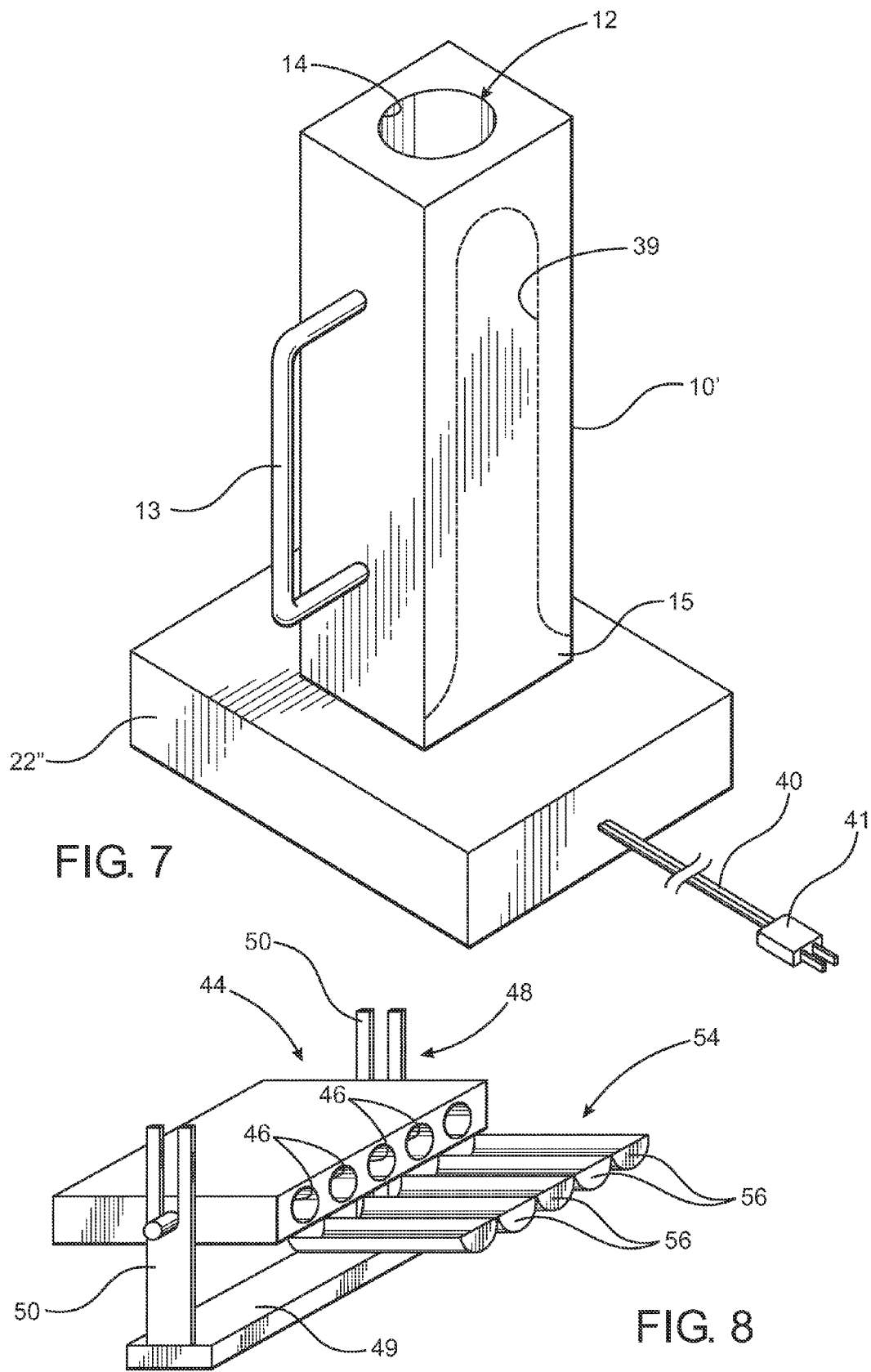

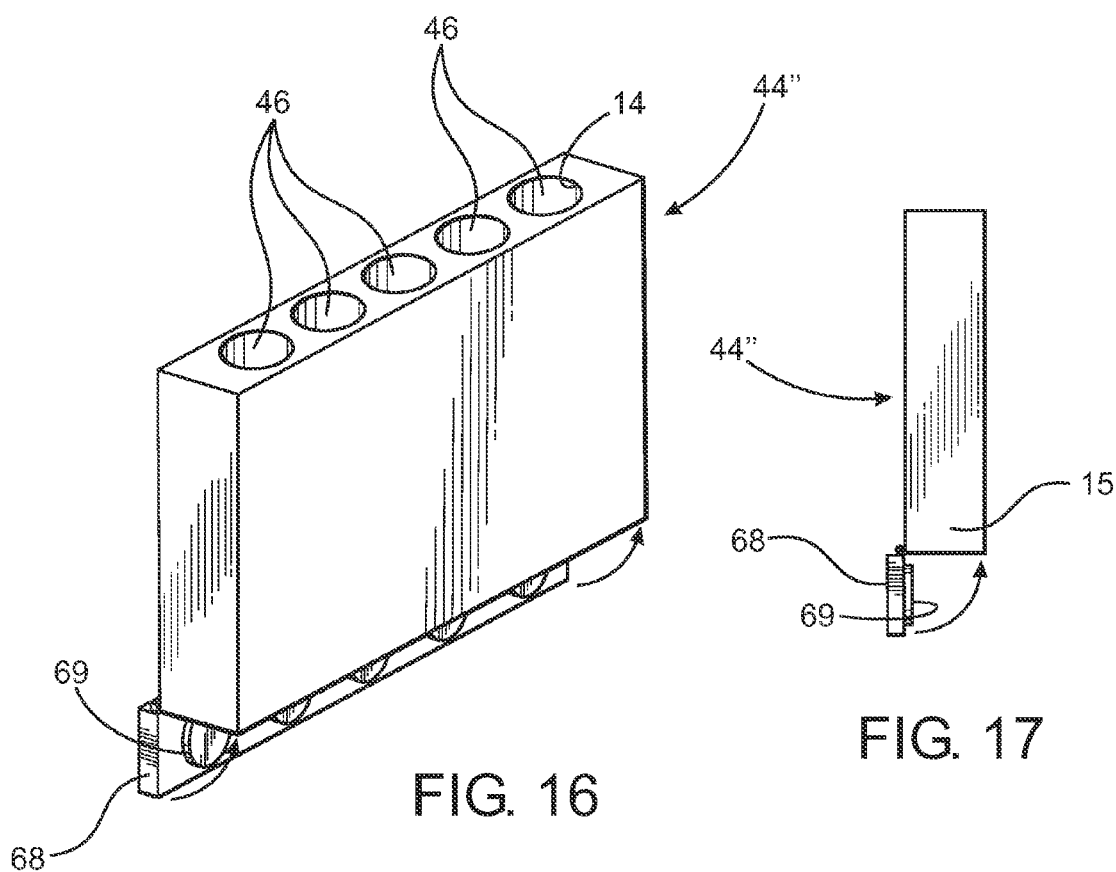
FIG. 16
FIG. 17
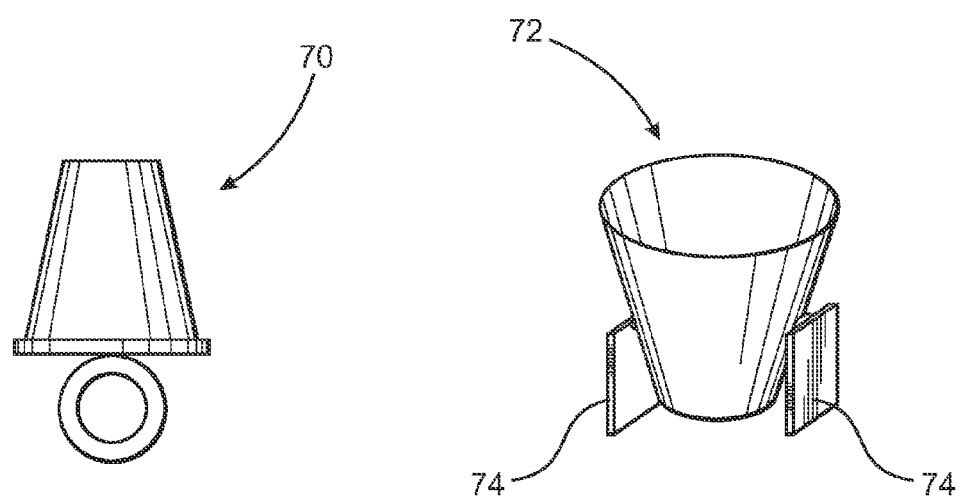
FIG. 18
FIG. 19

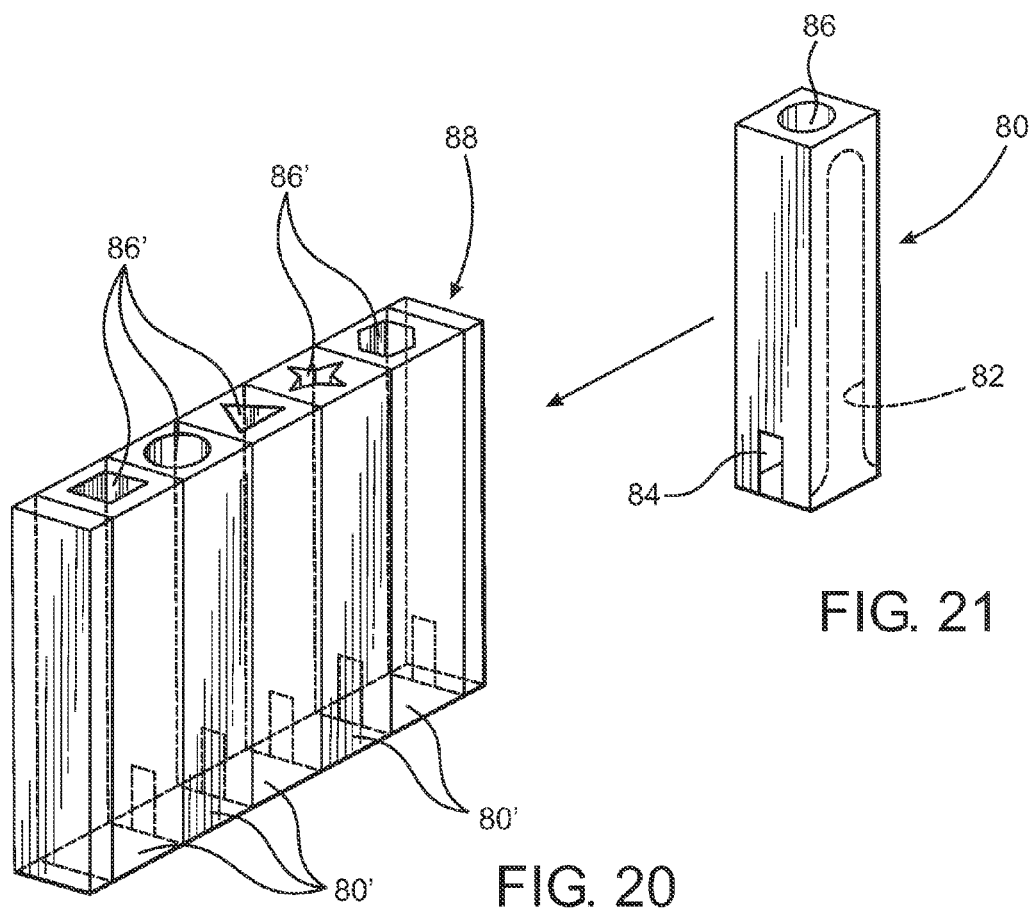
FIG. 21
FIG. 20
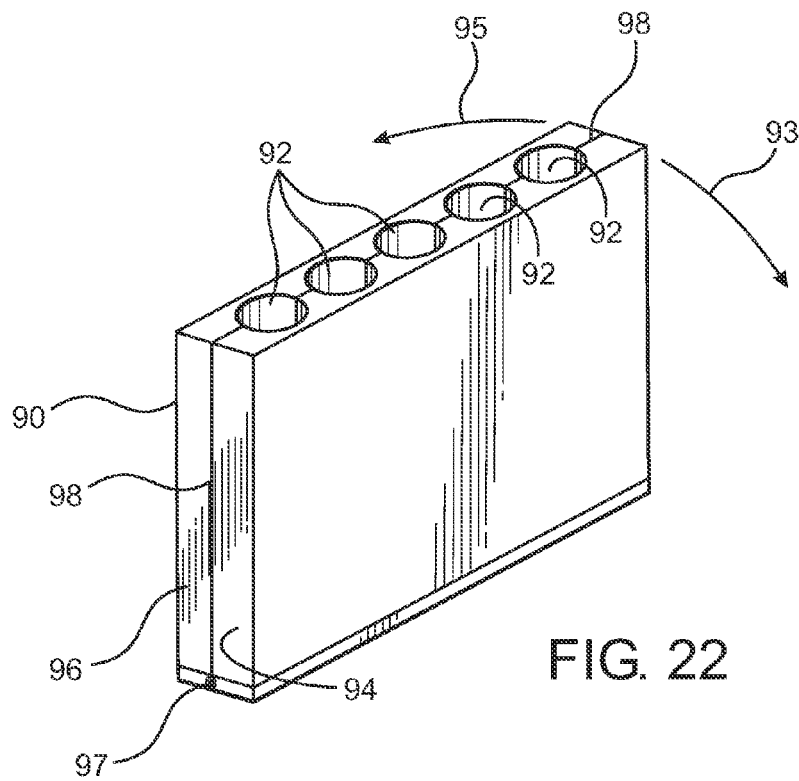
FIG. 22

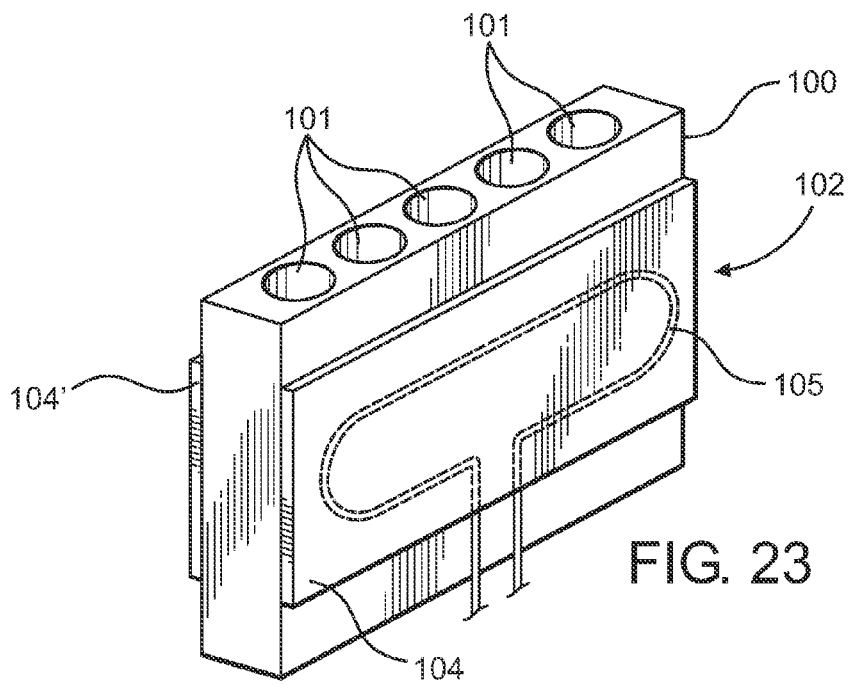
FIG. 23
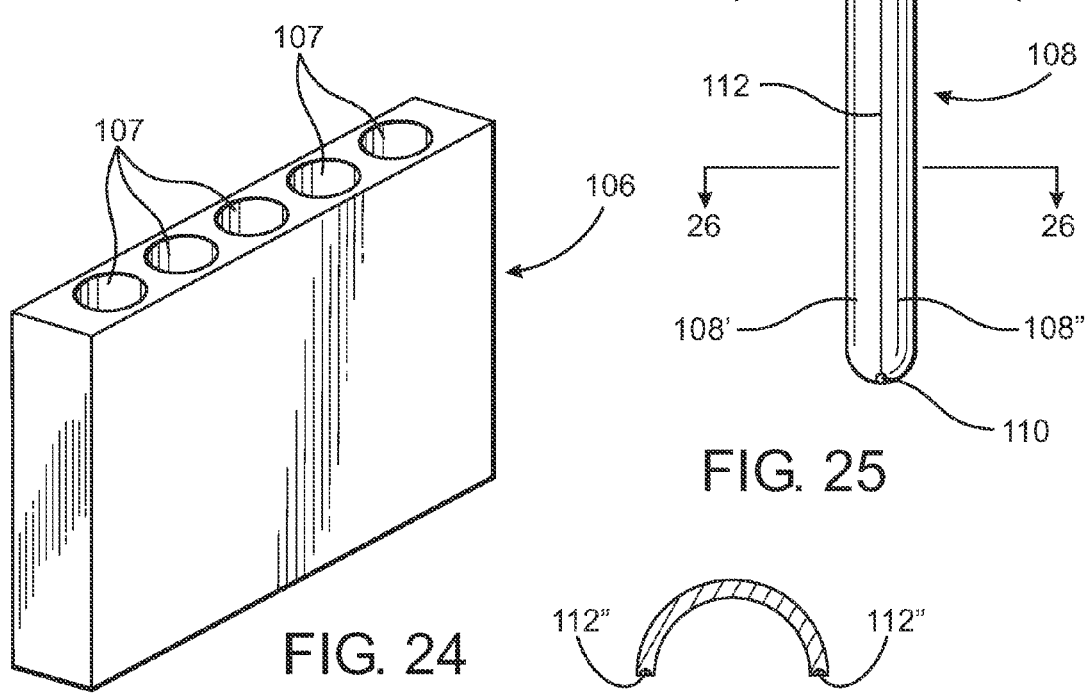
FIG. 24
FIG. 25
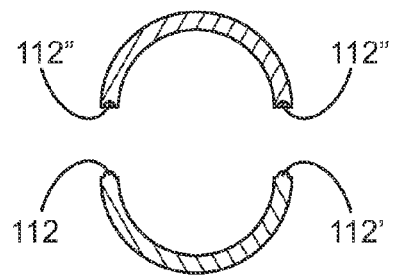
FIG. 26

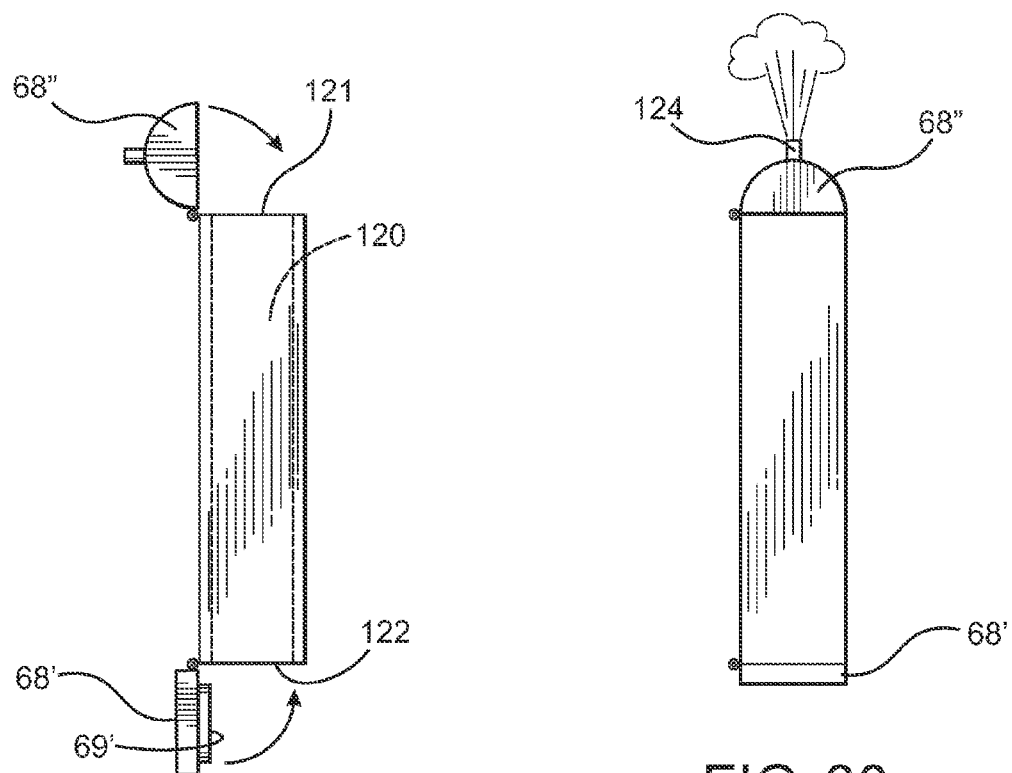
FIG. 29
FIG. 30
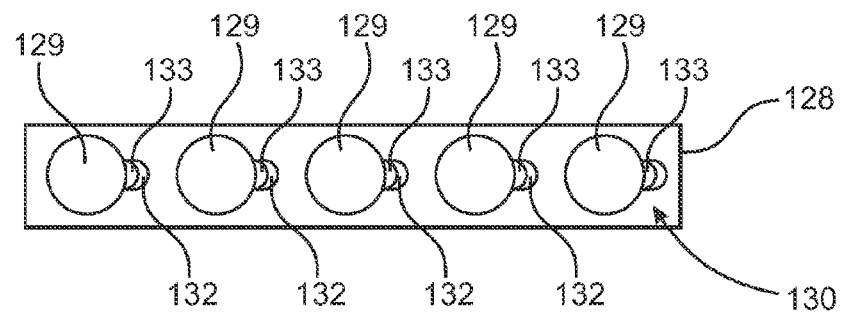
FIG. 31
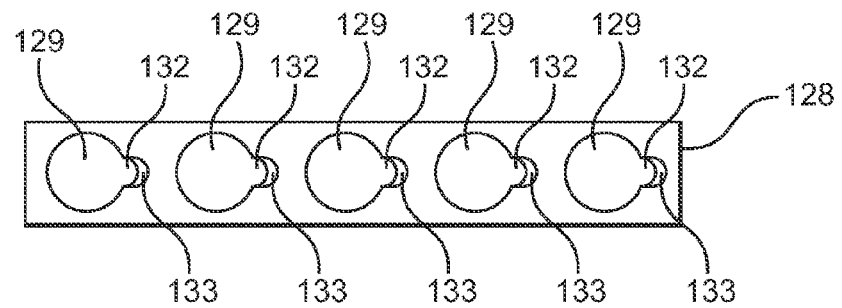
FIG. 31A

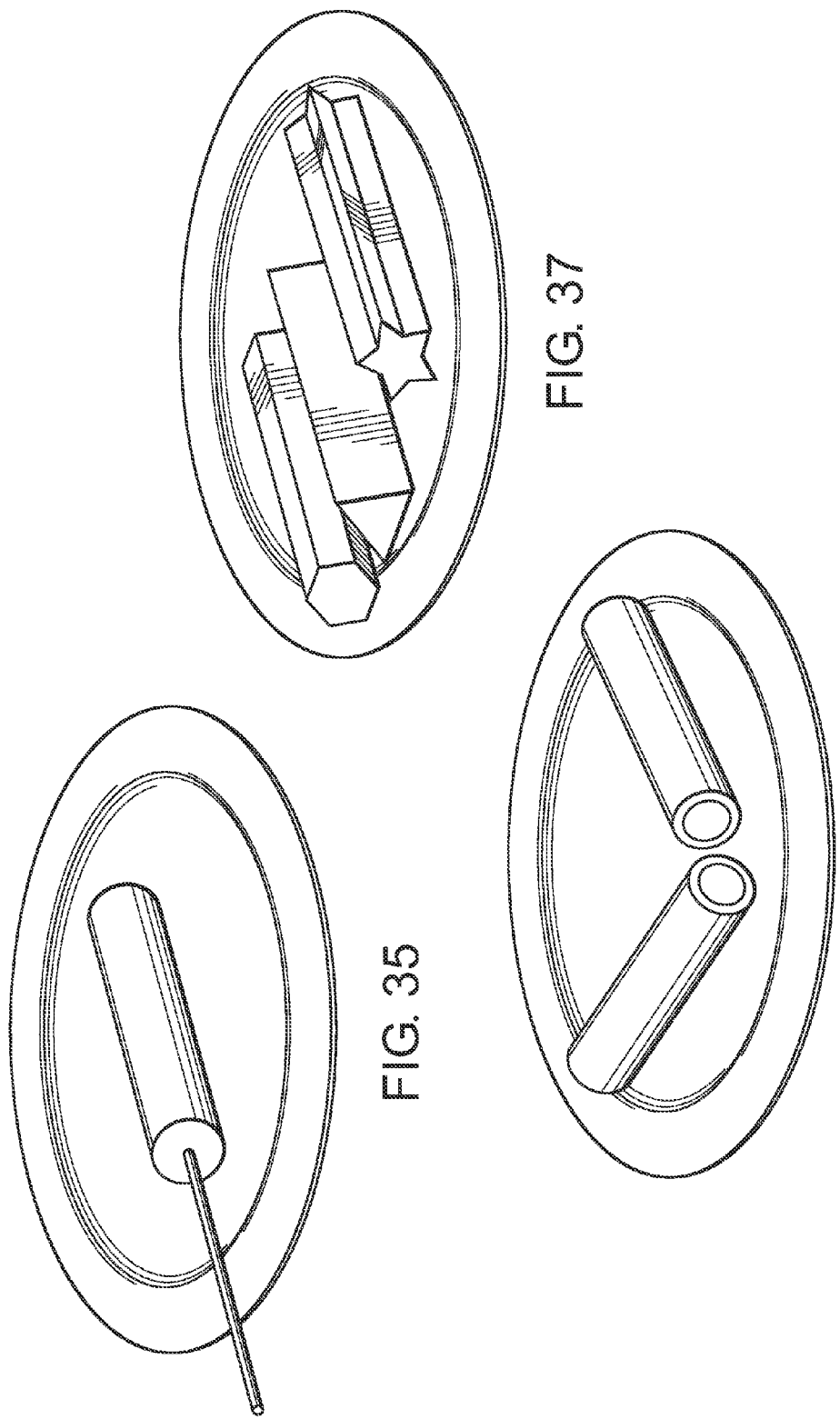

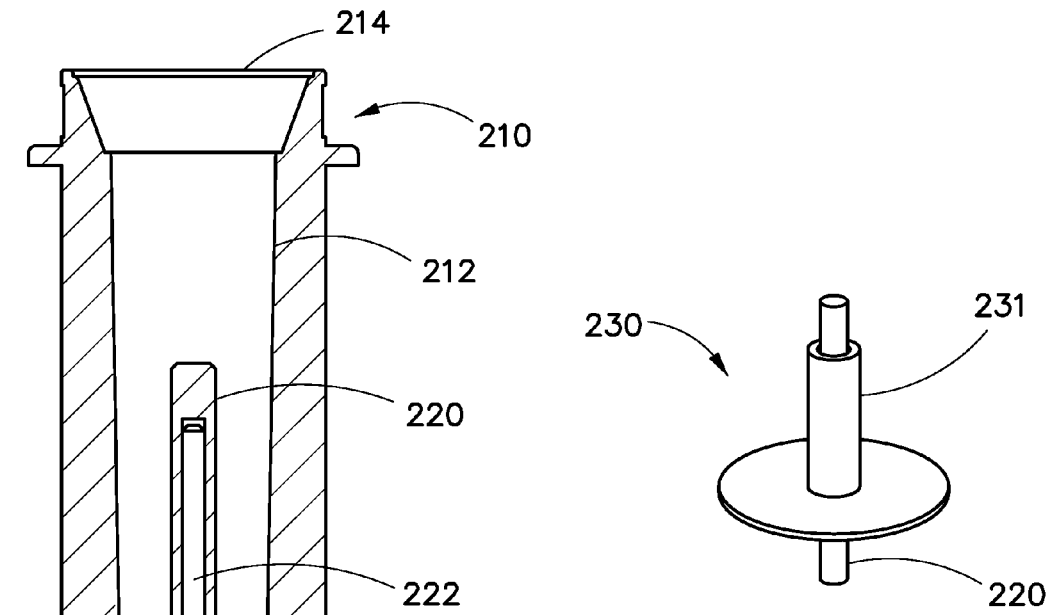
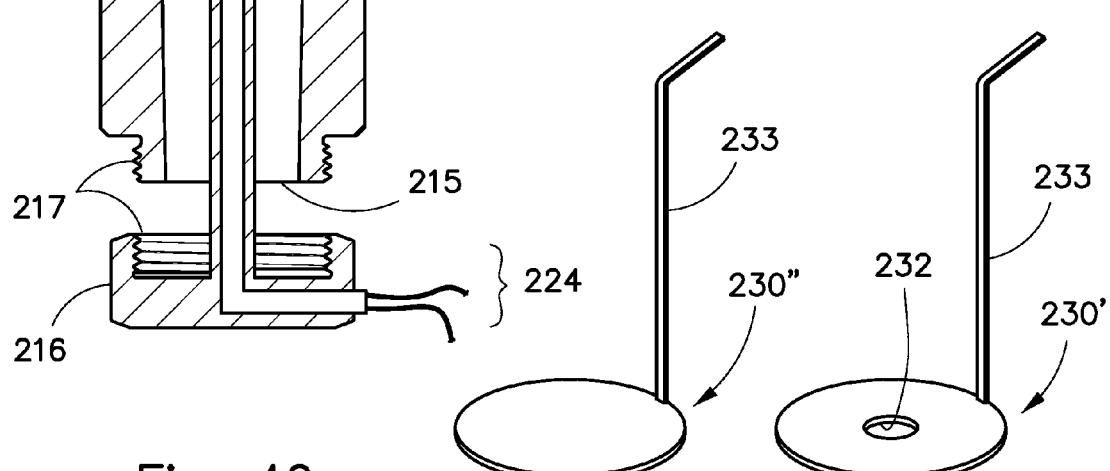
Fig. 40
Fig. 41
Fig. 43
Fig. 42

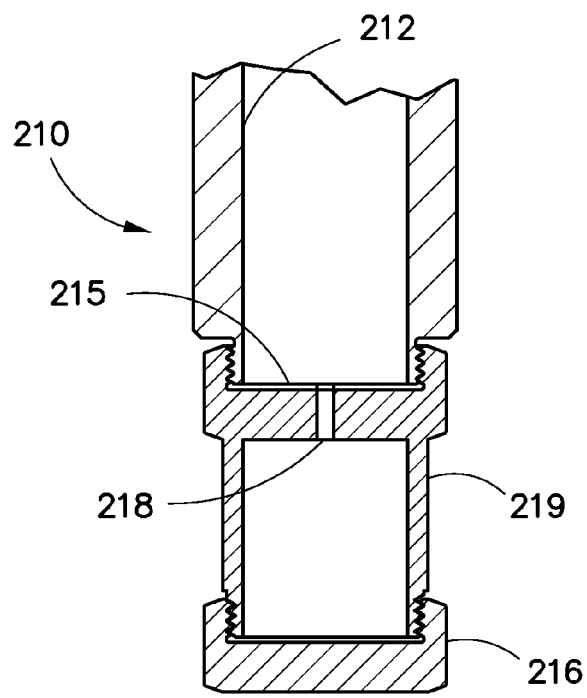
Fig. 50
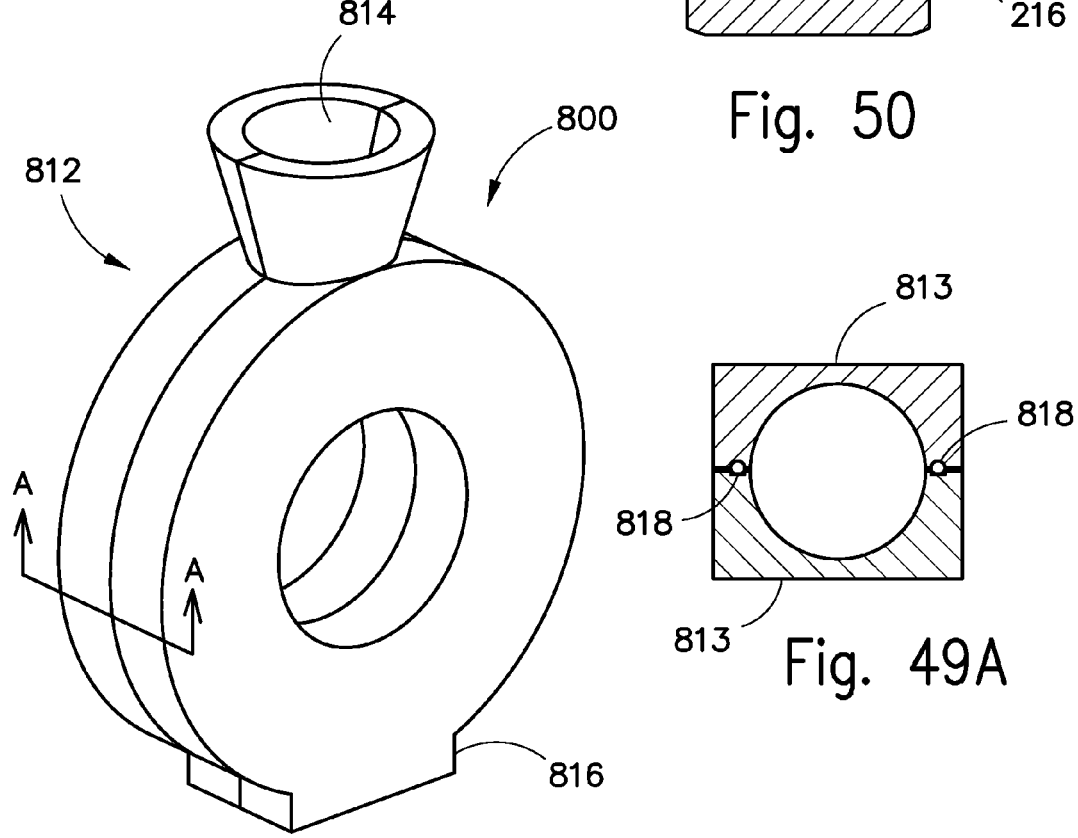
Fig. 49A
Fig. 49

ASSEMBLY FOR COOKING ELONGATED FOOD PRODUCTS

BACKGROUND OF THE INVENTION

1. Field of the Invention

This invention is directed to assemblies for cooking various food compositions, initially having a liquid, semi-liquid, semi-solid, or solid consistency, comprising at least one mold housing and/or mold chamber, wherein the cooking procedure takes place while the mold housing and associated mold chamber are maintained in a substantially upright orientation. As a result, the cooked food product is elongated or otherwise dimensioned and configured to substantially correspond to the interior dimensions and configurations of the mold chamber.

2. Description of the Related Art

Various types of cookware including pots, pans, baking dishes, etc., have been known and commonly utilized for centuries. Food to be cooked is placed within the particular cooking vessel and heat generally from an exterior source such as a stove, hot plate, etc., is applied thereto. Once the cooking procedure has been completed the cooked food product is removed from the cooking vessel and placed on some type of serving plate or the like. Common to this type of conventional cooking is that the cooked product does not assume any specific or customized shape or configuration. It is of course recognized that various types of food molds are utilized primarily, but not exclusively, for decorative purposes in the preparation of cakes, pastries, gels and other food types which may be easily shape or formed. However, such "food shaping" is generally limited to the restricted food types as set forth above or to frozen food products.

However, there is a desire for cooking devices which are capable of customizing a variety of different food products into potentially utilitarian configurations. Such shaping of food products may also be more appealing from an aesthetic point of view as well as providing certain practical features, which make the consumption and handling of the specifically shaped food product more enjoyable. By way of example, the conventional "hot dog" or sausage type sandwich is enjoyed in many countries throughout the world not only because of the flavor and texture but also because of the elongated configuration allows a hot dog, sausage, etc., to be picked up and consumed without the need for forks, knifes, or like eating utensils.

Accordingly, the desirability exists for a cooking assembly capable of customizing the shape and/or dimension of a variety of different food products so that they will be more attractive from an aesthetic and/or utilitarian point of view. Further, such a proposed cooking assembly should be capable of being structurally modified for use commercially and domestically without the need for extensive experience, cooking skill, or time consuming preparation, prior to and during the cooking procedure.

Various embodiments of such a proposed cooking assembly should include the ability to prepare a single cooked food product or alternatively a plurality of food products which may include common or different food ingredients. In addition, such a proposed cooking assembly should be capable of cooking a food composition which includes at least one component which is originally in a liquid, semi-liquid or like consistency form. By way of example, various egg mixtures or compositions may be prepared while in a substantially liquid form, wherein additional food ingredients may be added to the egg mixture. When properly combined, the mixture may be poured or otherwise appropriately be disposed into one or more "mold chambers" for the cooking thereof. Accordingly, the cooking procedure would thereby include the shaping and dimensioning of the final cooked product so as to correspond to the mold chamber in which it is cooked. As a result, the aforementioned food composition, initially in the form of a liquid mixture would be capable of being formed into the substantially elongated "hot dog" or sausage type configuration which would be appealing both from the utilitarian stand point of eating convenience, as well as the aesthetics in appearance.

Accordingly, such a proposed cooking assembly should be capable of cooking a substantially liquid food composition in the aforementioned mold chamber(s), while operatively disposed and maintained in a substantially upright orientation in order to facilitate the customized shaping of the final cooked product in an elongated configuration, for example, a "hot dog" shaped configuration.

SUMMARY OF THE INVENTION

The present invention is directed to an assembly for cooking various types of food products in a substantially upright orientation utilizing at least one mold housing having an interiorly disposed mold chamber. Further, the upright orientation of the mold housing and mold chamber during the cooking procedure facilitates the formation of the cooked food product into a configuration which substantially corresponds to the internal dimensions and configuration of the mold chamber in which it is cooked.

Moreover, the food product being cooked may be initially introduced into the mold chamber in the form of an uncooked liquid, semi-liquid or like consistency food composition, wherein the viscosity may vary dependent upon the particular ingredients utilized. By way of example only, an egg composition may be utilized to form an elongated "hot dog" like configuration. Clearly, a variety of other ingredients may be utilized as the initial food composition introduced into the mold chamber. Also, a mixture of ingredients may be utilized, wherein a primary food composition may include the aforementioned liquid, semi-liquid, consistency and additional solid food pieces or particles may be added prior to the instigation of the cooking procedure. Once again, by way of example, such solid food pieces may be disposed within the mold chamber, submerged within the uncooked liquid, semi-liquid or like consistency food composition, by being mounted on a skewer or like supporting structure, or by being added freely and allowed to submerge and mix into the uncooked liquid, semi-liquid or like consistency food composition. In yet another example, the food product being cooked may be initially introduced into the mold chamber in the form of an uncooked solid or semi-solid consistency food composition, wherein the solid or semi-solid food composition is placed into the mold chamber and essentially assumes the shape of the mold chamber, and retains said shape upon completion of a cooking cycle.

The versatility of the cooking assembly of the present invention is evidenced by a plurality of possible structural modifications or embodiments utilized to form one or concurrently a plurality of cooked food products with a predetermined and/or customized shape. Accordingly, the various embodiments of the cooking assembly of the present invention include one or more mold housing, each being at least partially formed of a heat transferable material and including at least one food mold chamber integrally or removably disposed on the interior thereof. Further, a plurality of such mold housings may be structured to be operatively connected to and/or supported on a frame assembly, wherein a plurality of food products may be simultaneously or independently cooked. Operative and structural features of the various embodiments also include a heat source integrated into the frame assembly being structured to concurrently or independently expose each of the mold housings and associated mold chambers to an adequate amount of heat to cook the food compositions contained therein. In at least one embodiment, at least the frame assembly is insulated to increase the heat transfer efficiency through the mold housing and mold chamber to the food composition to be cooked. In yet one further embodiment, the insulated frame assembly serves to protect users from extreme temperature on the exterior of the device.

Yet additional embodiments of the cooking assembly of the present invention include a single mold housing having a plurality of mold chambers integrally formed therein or removably connected thereto, such that either homogeneous or non-homogeneous food compositions may be introduced into different ones of the plurality of mold chambers. Moreover, the mold housings and associated plurality of mold chambers may be concurrently exposed to a common heat source which may be associated with a cooperatively structured frame assembly or incorporated directly into the mold housing(s) itself. In at least one embodiment, the heat source comprises a temperature controlled bath containing an amount of a heat transfer fluid which may be maintained at an optimal cooking temperature for a given food composition.

Alternatively, in at least one further embodiment, the required heat source may be externally disposed relative to a supporting frame assembly and/or one or more of the mold housings associated therewith. In such an embodiment, an external heat source may take the form of a hot plate, conventional stove surface or any other type of externally disposed heat source which may not be directly associated with the mold housings, mold chambers, or supporting frame assemblies.

In use, the liquid or fluid like consistency food composition is introduced into the interior of one or more mold chambers by a flow directing structure such as, but not limited to, a funnel or other insertion device. Before filling of the mold cavity at least the lower open end thereof is closed and at least partially sealed, at least to the extent of substantially restricting leakage of the liquid food composition from the lower end of the mold cavity. The aforementioned heat source is activated and the one or more mold chambers associated with the one or more mold housings are exposed to a heat sufficient to accomplish cooking and, accordingly, at least partial solidification of the food product.

Once cooked, various structural features associated with the mold housing facilitate a removal of the cooked food product without damaging it or significantly altering the intended configuration thereof. Moreover, the cooked food product may be removed from corresponding ones of the mold chambers by movably interconnecting sections of the mold housing to one another so as to define a substantially "clamshell" structure. At least partial separation of the mold housing sections is thereby possible so as to easily access the cooked food product within the mold chamber. Alternatively, various devices can be utilized to physically remove the cooked food product without causing damage thereto, as explained in greater detailed hereinafter. Other additional features associated with the various embodiments of the cooking assembly of the present invention may include a venting assembly structurally adapted to accommodate the release of pressure or vacuum which may build up in a mold chamber during a cooking procedure in the various structural embodiments of the mold housings and/or associated mold chambers. Such venting assemblies are structured to release excessive pressure, such as by venting steam, evaporated fluid, heated air, etc., or by breaking a vacuum which may be created between a cooked or semi-cooked food composition and the mold housings and/or associated mold chambers.

Therefore, the cooking assembly of the present invention satisfies the needs and desires which may be associated with domestic as well as commercial preparation of relatively uniquely shaped cooked food products, wherein the food products may include a wide variety of ingredients initially introduced into one or more mold chambers in a liquid or like consistency state. Further, such liquid food compositions may be combined with solid food compositions, thereby allowing for the effective and efficient creation of a unique and customized food product. Alternatively, an uncooked solid or semi-solid consistency food composition may be placed into a mold chamber such that the solid or semi-solid food composition essentially assumes the shape of the mold chamber for cooking therein.

These and other objects, features and advantages of the present invention will become clearer when the drawings as well as the detailed description are taken into consideration.

BRIEF DESCRIPTION OF THE DRAWINGS

For a fuller understanding of the nature of the present invention, reference should be had to the following detailed description taken in connection with the accompanying drawings in which:

FIG. 1 is a perspective view of one embodiment of the present invention including a frame assembly having a single mold housing including an interior mold chamber operatively connected thereto.

FIG. 2 is a sectional view of a base structure associated with the mold housing of the embodiment of FIG. 1.

FIG. 2A is a heat resistant insert which may be utilized in combination with the base structure of FIG. 2.

FIG. 4 is a perspective view of a single mold housing having a single interior mold chamber.

FIG. 5 is a side view of a base structure which may be utilized with the embodiment of FIG. 4.

FIG. 6 is a plan view of the base structure of FIG. 5.

FIG. 7 is a perspective view of yet another embodiment of a mold housing and fixedly attached base.

FIG. 8 is a perspective view of yet one other embodiment of a frame assembly and cooperatively structured mold housing having multiple mold chambers disposed therein.

FIG. 16 is a perspective view of a structural modification of the mold housing of the type which may be used with the frame assembly of the embodiment of FIG. 13.

FIG. 17 is an end view of the embodiment of FIG. 16.

FIG. 18 is a perspective view of a stopper or closure structure which may be utilized with any of a plurality of the different embodiments of the present invention.

FIG. 19 is a funnel which may be used to introduce a liquid food composition into a mold chamber.

FIG. 20 is a perspective view of yet another embodiment of the present invention disclosing a plurality of operatively connected mold housings each having a single interior mold chamber comprising different cross-sectional configurations.

FIG. 21 is a perspective view in detail of one of the mold housings and associated mold chambers which may be utilized with the frame assembly of the embodiment of FIG. 20.

FIG. 22 is a perspective view of yet another embodiment of a mold housing comprising a plurality of mold chambers.

FIG. 23 is yet another embodiment of a mold housing comprising a plurality of mold chambers and an integrated heat source.

FIG. 24 is a perspective view of yet another embodiment of a mold housing structured to be used with a plurality of removably insertable mold chambers.

FIG. 25 is a front view of a mold chamber which may be utilized with the mold housing of the embodiment of FIG. 24.

FIG. 26 is a partially exploded sectional view of the embodiment of the mold chamber of FIG. 25 along lines 26-26 thereof.

FIG. 29 is a side view in partial phantom of the embodiment of FIG. 28 in an open position.

FIG. 30 is a side view of the embodiments of FIGS. 28 and 29 in a closed position.

FIG. 31 is a transverse sectional view of yet another embodiment of a mold housing of the present invention incorporating a vent assembly represented in a closed position.

FIG. 31A is transverse sectional view of the embodiment of FIG. 31 with the vent assembly in an open position.

FIGS. 35 through 39 are representative of just a few of the plurality of food products prepared utilizing a cooking assembly in accordance with the present disclosure.

FIG. 40 is a cross-section of a mold housing and base in accordance with the present disclosure further comprising an internal shaft.

FIGS. 41, 42, and 43 are perspective views of different configurations of a mold chamber cover in accordance with the present disclosure.

FIG. 49 is a perspective view of a one of a plurality of shaped mold chambers in accordance with the present disclosure.

FIG. 49A is a cross-section of the embodiment of FIG. 49 along lines A-A thereof.

FIG. 50 is a cross-section of one embodiment of a grease chamber in accordance with the present disclosure.

Like reference numerals refer to like parts throughout the several views of the drawings.

DETAILED DESCRIPTION

Figure 2B:
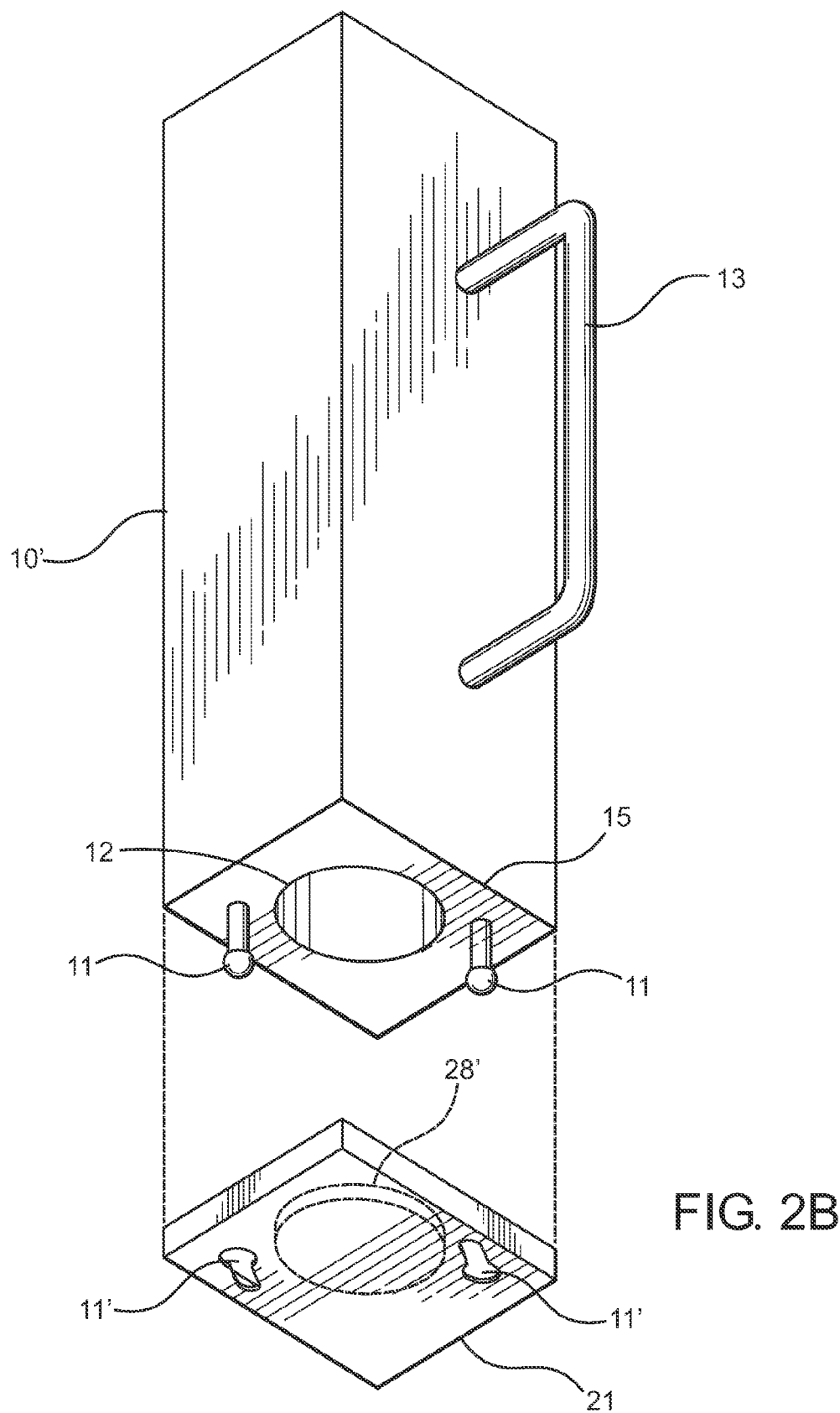
FIG. 2B is a perspective view of another embodiment of a mold housing in accordance with the present disclosure comprising a "quick-connect" mechanism to securely yet releasable interconnect a base structure thereto.
Figure 3:
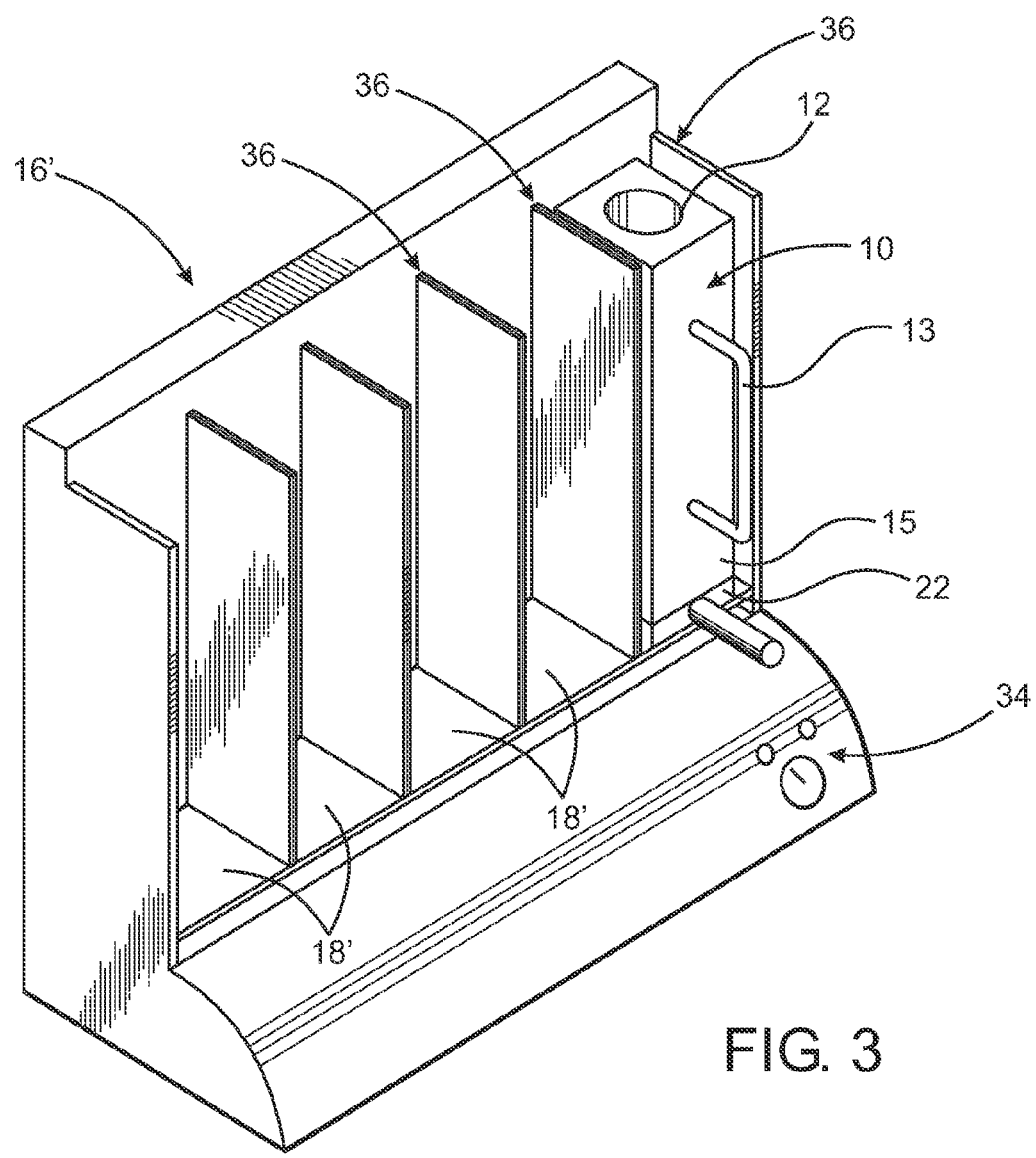
FIG. 3 is another embodiment of the present invention incorporating a frame assembly structurally modified from that of the embodiment of FIG. 1 so as to be operatively connected to and support any one of a plurality of different mold housings preferably having cooperatively configured base structures.

As represented in FIGS. 1 through 3, at least one embodiment of the cooking assembly of the present invention includes at least one but more practically a plurality of mold housings 10 each of which includes an internal mold chamber 12 extending along at the least the majority of the length of the corresponding mold housing 10 and/or along substantially the entire length thereof. As such, the cooking of a variety of different liquid, semi-liquid, semi-solid, and/or solid or like consistency food compositions is accomplished within the interior of the mold chamber 12 and may be introduced therein through an open upper end as at 14. As such, a lower end 15 of the mold housing 10 is interconnected to a frame assembly generally indicated as 16. It is emphasized that the terms "upper" and/or "lower", when referring to various parts of the mold housing(s) and mold chamber(s) are used when the mold housing(s) and/or mold chamber(s) are in the substantially upright orientation. The mold chamber 12 or at least the internal surfaces of mold chamber 12 may comprise Teflon, high temperature silicon, glass or glass-lined, stainless steel, ceramic, aluminum, or other such non-stick material as is suitable for contact with food products for consumption by humans as well as having adequate thermal stability and heat transfer properties for use in cooking food products. Further, in at least one embodiment the mold housings 10 and mold chambers 12 comprise material(s) of construction being dishwasher safe to facilitate cleaning the mold housing 10 between usages.

More specifically, the frame assembly 16 includes at least one but more practically a plurality of receiving sections 18 which in the embodiment of FIG. 1 are at least partially defined by recessed open cavities 20. Each of the recessed cavities 20 is dimensioned and configured to receive at least a portion of the lower end 15 of the mold housing 10 therein such that the mold housing 10 as well as the mold chamber 12 are disposed in the substantially upright orientation. With primary reference to FIGS. 2 and 2A, the embodiment of the mold housing 10, as represented in FIG. 1, is further structured to be used in combination with a base structure generally indicated as 22. The base structure 22 includes an interior socket 24 which is dimensioned and configured to receive the lower open end 15 of the mold housing 10 therein. As will be more fully explained hereinafter, the lower end 15 of the mold chamber 12 is also open and is cooperatively dimensioned and configured to receive a plug structure 26 such as is disposed in the socket 24 of the base structure 22.

As such, the plug 26 will pass into and close and/or at least partially seal the opening associated with the lower open end 15 of the mold housing 10 and mold chamber 12. Such a sealing closure of the plug 26 with the lower open end 15 will substantially restrict leakage of the liquid food composition from the interior of the mold chamber 12 through the lower open end 15. Moreover, the plug 26 may include an integral or removably connected insert member 28 preferably formed of a heat resistant, non-stick material, such as Teflon, silicon, etc. When the plug structure 26 is in the closed position of FIG. 2, the insert 28 defines the outer exposed surface of the plug 26. This disposition of the insert 28 is such that it would pass through opening of the lower end 15 of the mold housing 10 and thereby come into confronting engagement with the food composition being cooked on the interior of the mold chamber 12. As such, the non-stick material from which the insert 28 is formed will substantially prevent the food composition from adhering to the plug 26 during and after the cooking procedure.

Therefore, with primary reference to FIGS. 1 and 2, the base structure 22 is secured to the lower end 15 of the mold housing 10 so as to at least partially seal and close the opening associated with the lower end 15. The base structure 22 and mold housing 10 may then be placed within any one of the recessed cavities 20 defining the receiving sections 18. As such, the base structure 22 is disposed in an interconnecting and supporting relation to the lower end 15 as well as the remainder of the mold housing 10 such that the mold chamber 12 and the mold housing 10 are operatively connected to the frame assembly 16 in the substantially upright orientation. Interconnection between the base structure 22 and any one of the recessed cavities 20 is accomplished by the insertion of the base structure 22 into a selected recess cavity 20. As such, a concentric but removable interconnection occurs by the base structure 22 being disposed within the interior of a selected one of the recessed cavities 20 and being disposed exteriorly of the lower end 15 of the mold housing 10.

The filling of the mold chamber 12 through the open end 14 with a selected food composition may be accomplished subsequent to the assembly of the base structure 22 and the mold housing 10 and either before or after the base structure 22 and mold housing 10 are connected to the frame assembly 16 by insertion into one of the recess cavities 20. It should be apparent that the handling, positioning and overall manipulation of the base structure 22 as well as the mold housing 10 are facilitated using appropriately disposed and structured handle members 13 and 23, respectively.

An additional feature associated with the embodiment of FIG. 1 is a heat source 30 being integrated within or otherwise connected to the frame assembly 16. More specifically, the included heat source 30 of the embodiment of FIG. 1 includes a single heating panel or plate 32 connected to an external electrical energy source and disposed in communicating relation with each of the receiving sections 18 and a corresponding mold housing 10 operatively positioned therein. Therefore, when one or more mold housings 10 are disposed in different ones of the cavities 20, activation of the heating panel or plate 32 by appropriate switching or control assembly 34 will serve to accomplish sufficient heat transfer from the heating panel or plate 32 to each of the one or more mold housings 10 connected to the frame assembly 16. Due to the fact that each of the mold housings 10 are at least partially formed from a heat transferable material, the confronting relation or closely aligned disposition between the connected mold housings 10 and the heating panel 32, as illustrated in FIG. 1, will provide sufficient heat to cook the food composition within the mold chambers 12. It should be further noted that the switching or control assembly 34 may also include appropriate thermostat capabilities so as to regulate the heat and generate an appropriate cooking temperature to which the food composition within the mold chamber(s) 12 is exposed and/or may incorporate a timer mechanism to control the duration of a cooking cycle. The control assembly 34 may further incorporate one or more timer, temperature indicator, visible and/or audible indicator, such as a flashing light or alarm.

FIG. 2B is illustrative of one alternative embodiment of a mold housing generally as shown at 10'. In this embodiment, the lower end of mold housing 10' comprises a quick connect mechanism for interconnection of base structure 21 to mold housing 10'. In the illustrative embodiment of FIG. 2B, the quick connect mechanism comprises a plurality of quick connect pins 11 disposed in a predetermined array on the lower end 15 of the mold housing 10'. As further illustrated in FIG. 2B, the base structure 21 comprises a plurality of quick connect receiving slots 11' formed therein, the quick connect receiving slots 11' being cooperatively structured and disposed to receive corresponding ones of the quick connect pins 11 in a secure yet releasable orientation. Of course, it will be appreciated that it is well within the scope and intent of the present disclosure for any of a plurality of "quick-connect" type of mechanisms to be utilized to provide a secure yet removable interconnection between the lower end 15 of the mold housing 10' and the base structure 21, and that the embodiment of FIG. 2B is merely illustrative of said plurality of "quick-connect" type mechanisms.

Similar to the embodiment of FIGS. 2 and 2A, the base structure 21 comprises an insert 28' structured to pass into the open end of the mold chamber 12 and thereby come into confronting engagement with the food composition being cooked on the interior of the mold chamber 12. As such, the non-stick material from which the insert 28' is formed will substantially prevent the food composition from leaking out from the open end of the mold chamber 12 as well as to prevent the food composition from sticking to the base structure 21 during and after the cooking procedure.

As illustrated in FIG. 2B, the base structure 21 is thereby secured to the lower end 15 of the mold housing 10' so as to at least partially seal and close the open end of the mold chamber 12 associated with the lower end 15. It will be appreciated that the base structure 21 and mold housing 10' will be free standing on a flat surface, such that the recessed cavities 20 defining the receiving sections 18 of frame assembly 16 are not required. As before, the base structure 21 is disposed in an interconnecting and supporting relation to the lower end 15 as well as the remainder of the mold housing 10 such that the mold chamber 12 and the mold housing 10 may be disposed onto frame assembly 16 in a substantially upright orientation, wherein receiving sections 18 comprise a substantially flat planar configuration for support of mold housing 10' and base structure 21 thereupon.

FIG. 40 is illustrative of yet another free standing mold housing 210 and base 216. More in particular, a base interconnect 217 is employed to secure the base 216 to the lower end 215 of the integral mold chamber 212, thereby sealing at least a portion of the mold chamber 212 for purposes of cooking a food composition therein, while disposed in an upright orientation. The mold chamber 212 comprises an open upper end 214 through which an uncooked food composition may be added, and through which a cooked food product may be removed. As illustrated in FIG. 40, the mold chamber 212 comprises a tapered configuration 213, wherein the diameter of the mold chamber 212 at the open upper end 214 is greater then the diameter at the lower end 215. This tapered configuration 213 may be provided in any mold chamber disclosed herein in accordance with the present invention to facilitate the removal of a cooked food product therefrom.

The base interconnect 217 illustrated in FIG. 40 comprises a threaded interconnection, of course, a side mounted quick release interconnection or other such mechanical interconnections may be employed and are considered to be encompassed within the scope and intent of the present invention. FIG. 40 also illustrates male threads on the mold housing 210 and female threads affixed to the base 216, however, the placement of the male and female threads is not limiting, i.e., the female threads could be affixed to the mold chamber 210 and the male threads mounted to the base 216.

FIG. 40 further illustrates an internal shaft 220 extending upwardly and lengthwise through a substantial portion of the mold chamber 212. The internal shaft 220, in one embodiment, is constructed of a thermally conductive material so as to provide a source of heat through the base 216 to the inside of a food composition disposed in the mold chamber 212 for cooking. In the illustrative embodiment of FIG. 40, the internal shaft 220 comprises a heating element 222 extending therethrough to provide a further source of heat to a food composition in the mold chamber 212, the heating element 222 being operatively interconnected to a power supply, such as via power cord 224. In at least one embodiment, the internal shaft 220 comprises a tapered configuration so as to facilitate the release for a cooked food composition therefrom. Mold chamber 210 may be structured for disposition into a cooperatively configured frame assembly, such as are disclosed herein, to provide an additional heat source around the mold chamber 210 in the manner disclosed herein with respect to other embodiments of the present invention.

FIGS. 41 through 43 are illustrative of just a few of the various embodiments of a chamber cover which may be placed atop an uncooked food composition in a mold chamber during a cooking procedure, to at least partially retain an amount of heat energy therein as well as to maintain a uniform cylindrical or other configuration of a cooked food product being formed therein. More in particular, the chamber cover 230 illustrated in FIG. 41 comprises a "floating" cover having a guide member 231 affixed to chamber cover 230 which is structured to freely receive a portion of an internal shaft 220 therethrough. In operation, the chamber cover 230 is disposed over an uncooked food composition in a mold chamber, such as 212, with guide member 231 being disposed over a portion of an internal shaft, such as at 220, when the mold chamber comprises an internal shaft, and as the food cooks and rises or contracts, as the case may be, the chamber cover 230 moves upwardly or downwardly within the mold chamber, respectively, while maintaining contact with the upper end of the food composition being cooked. In the embodiment of FIG. 42, a guide aperture is formed through the chamber cover 230' and a cover handle 233 is attached thereto to allow a user to readily position the chamber cover 230' into and out of a mold chamber, once again, such as mold chamber 212. FIG. 43 illustrates a chamber cover 230" for use in an mold chamber not including an internal shaft, and as such, chamber cover 230" does not include a guide member or guide aperture therethrough.

With primary reference to the additional embodiment of FIG. 3, the frame assembly 16', as with the frame assembly 16 in the embodiment of FIG. 1, can support at least one but concurrently a plurality of mold housings 10 through the provision of a plurality of receiving sections 18'. Further, each of the mold housings 10, when operatively connected to the frame assembly 16', includes the aforementioned base structure 22 removably connected to the lower end 15 thereof. The assembled mold housings 10 and base structures 22 are disposed within selected ones of the receiving portions 18' and are supported and operatively connected to the frame assembly 16' in the substantially upright orientation. Different structural and operative features associated with the frame assembly 16' include the receiving sections 18' being somewhat elongated compartments segregated by a plurality of partitions 36. The spacing between the partitions 36, as well as the overall dimensioning and configuring of the receiving sections 18', at least partially correspond to the dimension and configuration of the one or more mold housings 10.

More specifically, when the mold housing 10 is operatively disposed in a selected one of the receiving sections 18', opposite sides thereof are disposed in confronting engagement and/or heat transferring relation with adjacent ones of the partitions 36 as represented. Therefore, in the embodiment of FIG. 3, the required heat source may be defined by a plurality of heat plates or panels serving as the partitions 36. Structuring of each of the heating panels and/or partitions 36 may be accomplished utilizing resistance elements formed on the interior of each of the partitions or panels 36 which are not represented in FIG. 3. Therefore, due to the heat transferring disposition of each of the heating panels and/or partitions 36 relative to the opposite sides of the mold housing 10, an appropriate amount of heat will be transferred through the mold housing 10 to the food composition maintained within the interior of the mold chamber 12. As with the embodiment of FIG. 1, the frame assembly 16' also may include switching or control assembly 34, which may further include heat regulating thermostat and/or cooking cycle capabilities.

Figure 44:
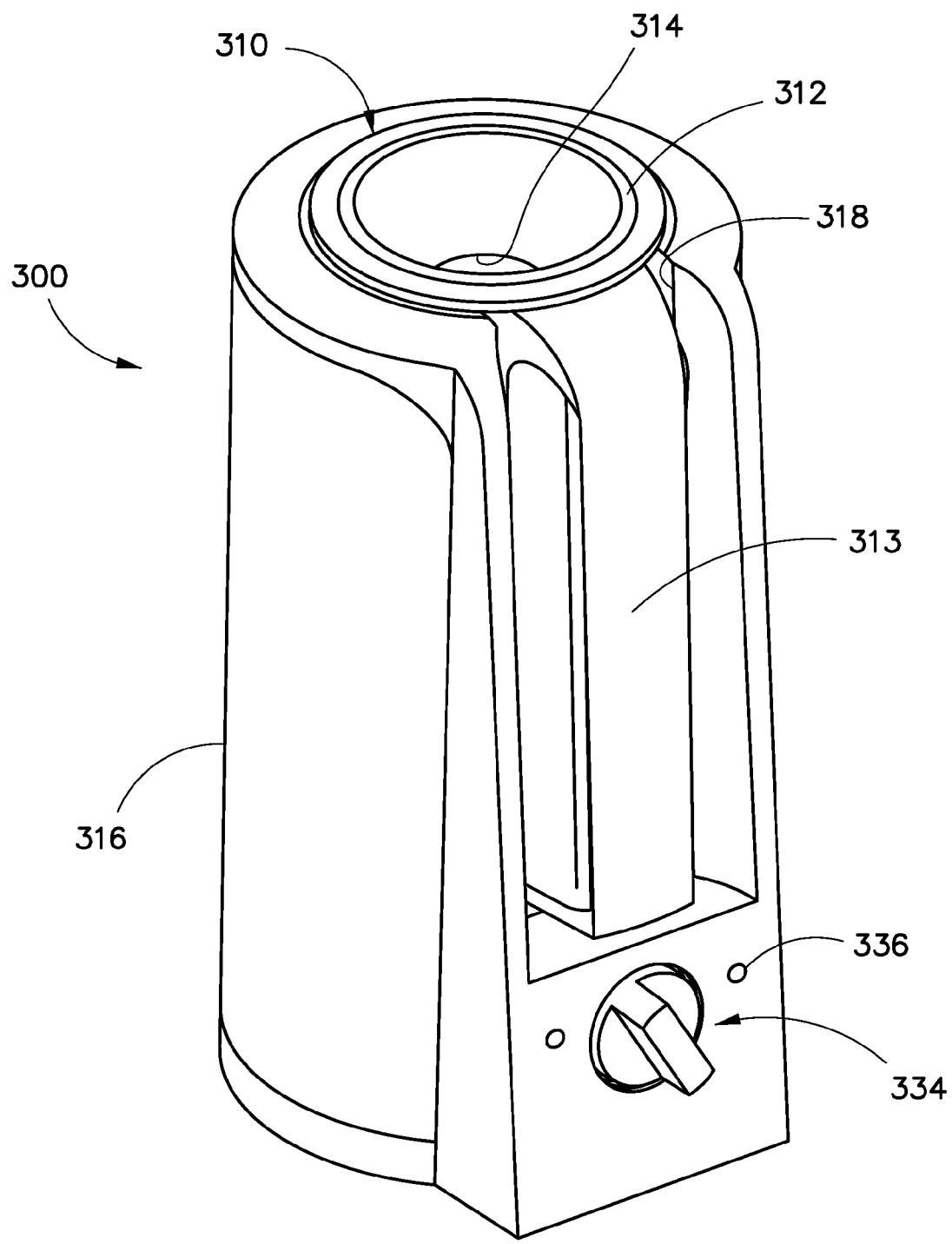
FIG. 44 is a perspective view of yet another embodiment of a cooking assembly comprising a mold housing having an integral mold chamber.

FIG. 44 is illustrative of a further embodiment of a cooking assembly 300 having a mold housing 310 including a mold chamber 312 therein which is disposable within a receiving portion 318 of a frame assembly 316. As shown in FIG. 44, the frame assembly 316 is formed so as to substantially surround the mold housing 310 when disposed in the cooperatively configured receiving portion 318 of the frame assembly 316. This configuration allows heat to be applied around a substantial portion of the mold housing 310, thereby providing a more even source of heat to the mold chamber 312, resulting in more even cooking of a food product therein. As in previously disclosed embodiments, the mold chamber 312 comprises an open upper end 314 to facilitate adding an uncooked food composition, as well as for removal of a cooked food product therefrom. Further, a handle 313 may be provided to allow ease of placement and removal of the mold housing 310 from the receiving portion 318 of the frame assembly 316. A control assembly 334 comprising one or more indicator 336 may be incorporated into cooking assembly 300 to provide a user with an indication, via on the activation of one or more indicator 336, that a preselected cooking temperature has or has not been achieved in or proximate the mold chamber 312.

The cooking assembly 300 as illustrated in FIG. 44 comprises a single mold housing 310 and a single mold chamber 312 disposed therein, however, it is deemed to be within the scope and intent of the present invention to provide a cooking assembly 300 comprising a plurality of mold chambers 310 with a corresponding plurality of mold chambers 312 disposed therein, and a frame assembly 316 defining a plurality of receiving portions 318 to receive the plurality of mold housings 310 therein. Alternatively, a single mold housing 310 may comprise a plurality of mold chambers 312 disposed therein, and a frame assembly 316 may comprise a receiving portion 318 structured to receive the mold housing 310 comprising the plurality of mold chambers 312.

Yet another embodiment of the cooking assembly of the present invention is represented in FIGS. 4 through 6. This embodiment includes a substantially equivalent mold housing 10 having a single interior mold chamber 12 formed therein and having an open upper end 14 and lower open end 15. As indicated above, the required heat source is not incorporated within the mold housing 10 but may be externally located. Accordingly, the mold housing 10 is structurally adapted for use in combination with a modified base structure 22' having a receiving socket 24' into which the lower open end 15 is positioned. Therefore, the base structure 22' serves to support and maintain the mold housing 10 as well as the mold chamber 12 in the substantially upright orientation. Moreover, the embodiments of FIG. 4 through 6 are intended to be used with the aforementioned external heat source. Accordingly, the base structure 22' further includes an enlarged support platform 27 extending outwardly from the socket 24'. Although the base structure 22' as illustrated in FIGS. 5 and 6 comprise a circular configuration, it is understood to be within the scope and intent of the present invention for a base structure 22' to encompass alternate geometric configurations. Therefore, when the mold housing 10 is operatively connected to the base structure 22' the supporting platform 27 will be disposed in supporting, resting engagement on external heat source such as a stove top, heating plate, etc. The formation of at least a portion of the mold housing 10, as well as the base structure 22', from a heat transferable material will allow for the adequate transfer of heat generated by the external heat source through the base structure 22' and mold housing 10 and to the mold chamber 12. As a result, adequate heat will be transferred to the interior of the mold chamber 12 to facilitate the cooking of the food composition disposed therein. While not specifically represented, the sealing or closed plug 26 including the insert plate 28 of non-stick material may also be incorporated in the interior of the socket 24' for purposes of closing and at least partially sealing the lower open end 15 of the mold housing 10, in a manner described in detail above with specific reference to FIGS. 1 and 2.

A further feature illustrated in FIG. 4 is a viewing window 12'. The viewing window 12' is constructed of an appropriately heat resistant and translucent or transparent material to allow a user to view the progress of a food composition as it is cooking within the mold chamber 12. Of course, it is understood that such a viewing window 12' may be incorporated into other mold chamber configurations, including at least those that are specifically disclosed herein.

Figure 48:
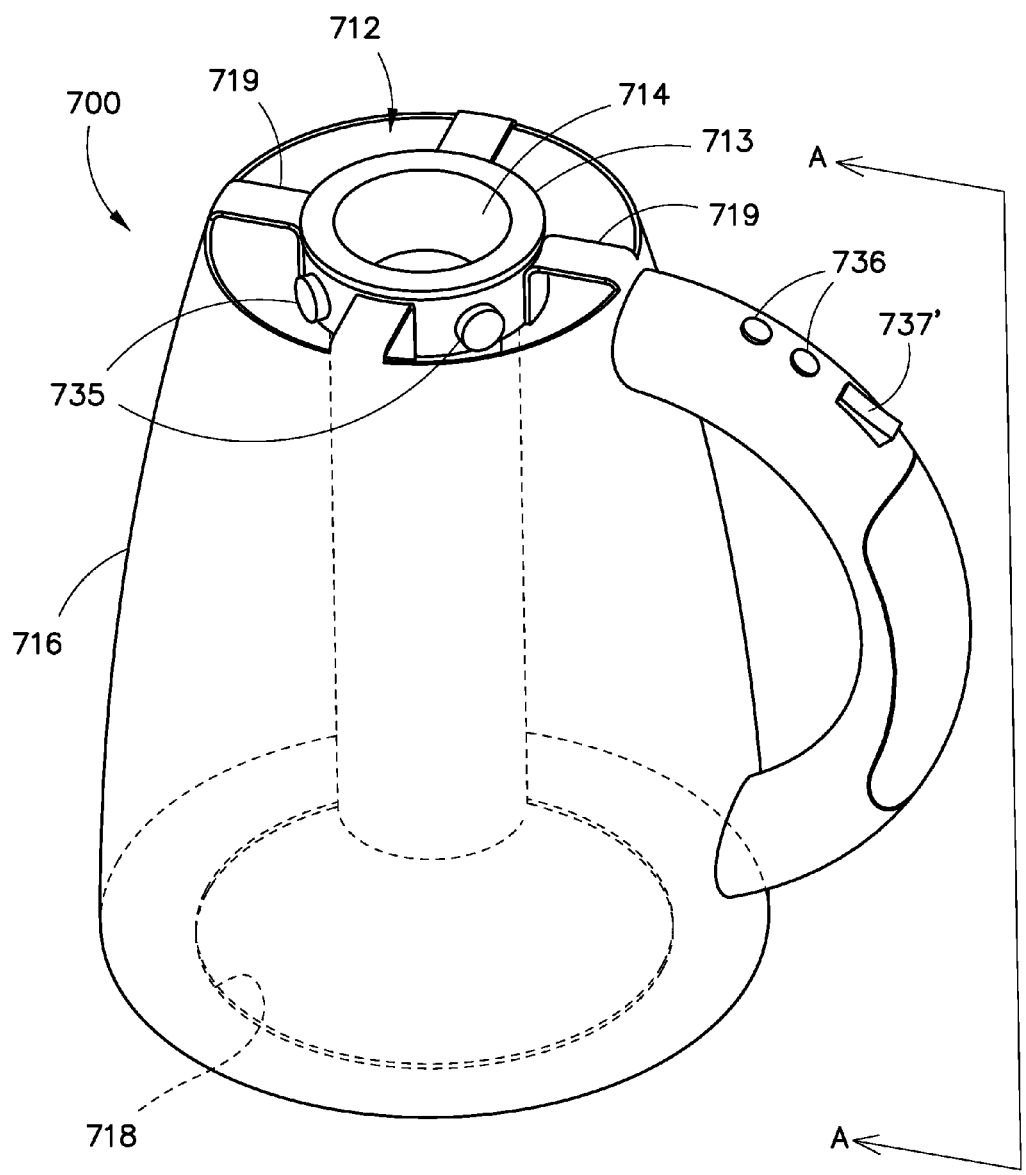
FIG. 48 is a perspective view of yet one further embodiment of a cooking assembly.
Figure 48A:
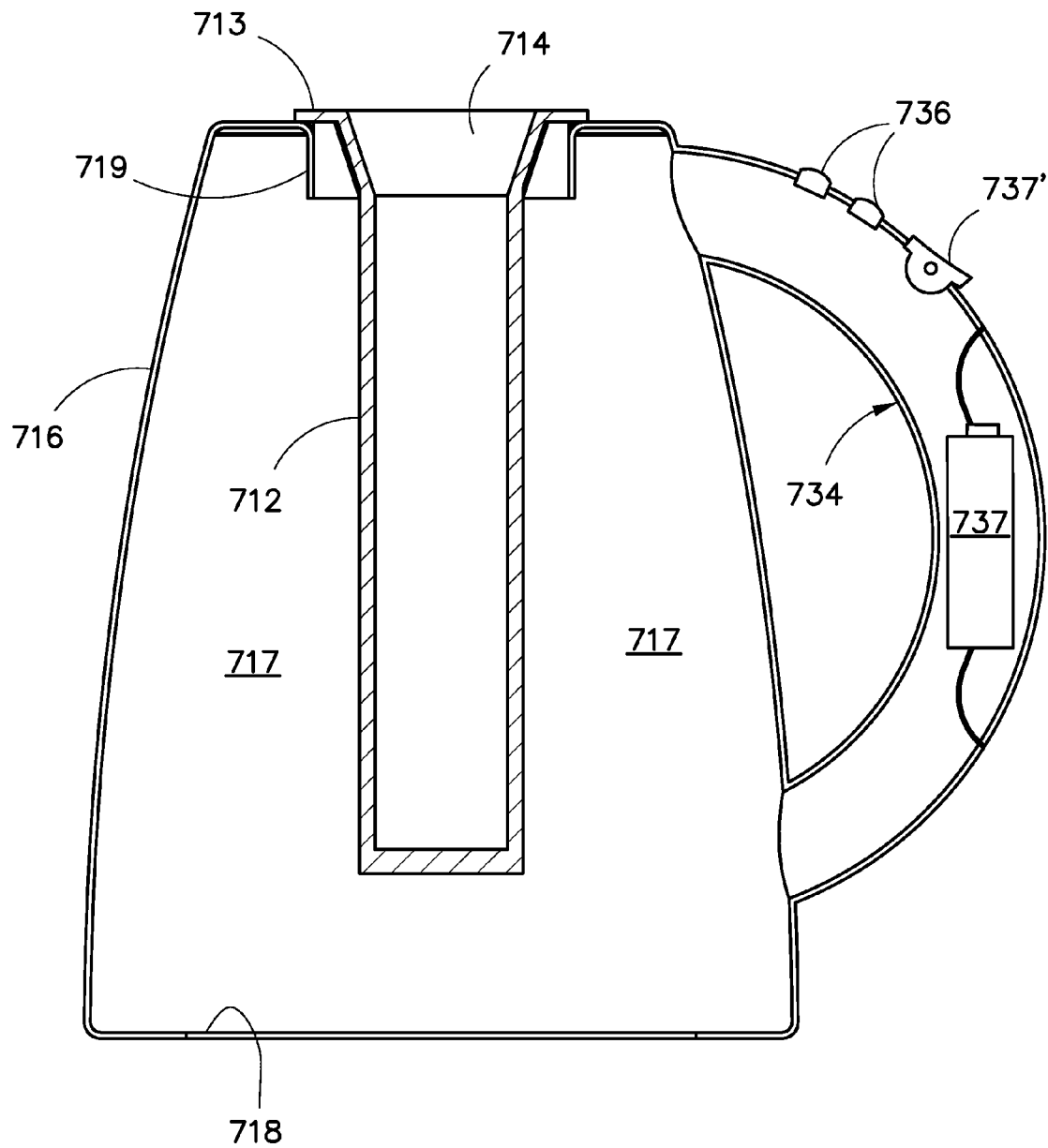
FIG. 48A is a cross-section of the embodiment of the cooking assembly of FIG. 48 along lines A-A thereof.

FIGS. 48 and 48A are illustrative of yet another embodiment of a cooking assembly 700 for cooking a food product in a substantially upright disposition which utilizes an external heat source, such as, a stove top, heating plate, grill, etc. More in particular, cooking assembly 700 includes a mold chamber 712 comprising a thermally conductive material structured to facilitate heat transfer therethrough. The mold chamber 712 has an open upper end 714 which, as in other embodiments of a mold chamber disclosed herein, is structured to receive an uncooked food composition therein, and to allow for removal of a cooked food product therefrom.

Furthermore, in the embodiment illustrated in FIGS. 48 and 48A, the cooking assembly 700 includes a frame assembly 716 having an open interior 717 and a heating aperture 718 disposed along a bottom surface, the heating aperture 718 being structured and disposed to allow an unimpeded transfer of heat energy from a heat source into the open interior 717 of the frame assembly 716. Although illustrated as a completely open aperture for purposes of clarity, the heating aperture 718 may comprise one or more support members extending across the opening which are structured to facilitate positioning the frame assembly 716 in a free standing disposition onto a heat source. In at least one embodiment, the frame assembly 716 comprises a material of construction exhibiting good radiative heat transfer properties, and in one further embodiment, the frame assembly 716 may comprise an outer insulative layer so as to focus or direct radiated heat energy from the frame assembly 716 to the mold chamber 712, and more in particular, the uncooked food composition disposed therein for cooking, when the frame assembly 716 is disposed in an operative position on a heat source. Further, in the embodiment illustrated in the figures, the frame assembly 716 comprises a tapered configuration, i.e., the lower portion of the frame assembly 716 being larger then the upper portion. This tapered configuration is provided so that hot air rising from the heat source through the heating aperture 718 to the upper portion of the open interior 717 of the frame assembly 716 is concentrated around the upper portion of the mold chamber 712, thereby providing a more even temperature profile along the length thereof, as the lower portion of the mold chamber 712 is disposed in closer proximity to the actual heat source.

As shown in the figures, the frame assembly 716 is structured to operatively engage and retain the mold chamber 712 in a substantially upright orientation while the frame assembly 716 is disposed in an operative position, i.e., the operative position being at least partially defined by the heating aperture 718 being positioned in an overlying relation to a heat source. Further, the mold chamber 712 is disposed substantially within the open interior 717 of the frame assembly 716. In at least one embodiment, the frame assembly 716 comprises a support bracket 719 which is structured to operatively engage at least a portion of the mold chamber 712 and retain the same in the substantially upright orientation. In the illustrative embodiment of FIGS. 48 and 48A, the mold chamber 712 comprises a support flange 713 proximate the open upper end 714, the support flange 713 being structured to operatively engage the support bracket 719 of the frame assembly 716. In at least one embodiment, the mold chamber 712 is securely affixed to the frame assembly 716.

The cooking assembly 700 may also comprise a temperature indicator assembly 734 structured to provide an indication to a user that the temperature in the open interior of the frame assembly 717 is within an optimum cooking range. The temperature indicator assembly 734 comprises at least one thermal switch 735, such as a bi-metal switch which is structured to actuate at a specific temperature threshold. The temperature indicator assembly 734 further comprises an indicator 736 structured to indicate when said interior of said frame assembly is at or within a predetermined temperature, such as, a temperature at which a bi-metal switch is actuated.

In the illustrative embodiment of FIGS. 48 and 48A, the temperature indicator assembly 734 comprises a plurality of thermal switches 735 and a corresponding plurality of thermal indicators 736. Such an arrangement may be utilized to indicate to a user that a minimum cooking temperature has been attained in the open interior 717 of the frame assembly 716, such as by activation of a first indicator 736 by a first thermal switch 735, as well as indicating that a maximum cooking temperature has been achieved, such as by activation of a second indicator 736 via actuation of a corresponding second thermal switch 735. As shown in the figures, the temperature indicator assembly 734 may comprise a power supply 737, such a battery, to provide power to the plurality of thermal indicators 736, and a power switch 737' which may activate the thermal indicator assembly 734 when in use and deactivate the same when not is use, to conserve the power supply 737.

Yet another embodiment of the cooking assembly of the present invention is a structural modification as illustrated in FIG. 7. More specifically, a mold housing 10" includes an integrated heat source 39 which may be in the form of a resistance element. The heat source or resistance element 39 is electrically connected to an electrical conductor 40 which may be connected to a conventional source of electrical energy, such as by plug member 41. Further, a base structure 22" may be fixedly or otherwise appropriately and removably connected to the lower end 15 of the mold housing 10" and may be of sufficient dimension and configuration to accomplish a stable support of the mold housing 10" and interior mold chamber 12 in the substantially upright orientation. Therefore, the embodiments of FIGS. 4 through 6 as well as the embodiment of FIG. 7 provide for the cooking of a food product by either an external heat source as described with references to the embodiments of FIGS. 4 through 6, or by integrating a heat source 39 directly in the mold housing 10", as in FIG. 7. It is emphasized that various structural modifications may be included within the embodiments of FIGS. 4 through 6 and 7, such as including more than one internally located mold chamber 12 in each of the mold housings 10 or 10" and/or removably rather then fixedly connecting the base structure 22" to the mold housing 10", as described.

Figure 45:
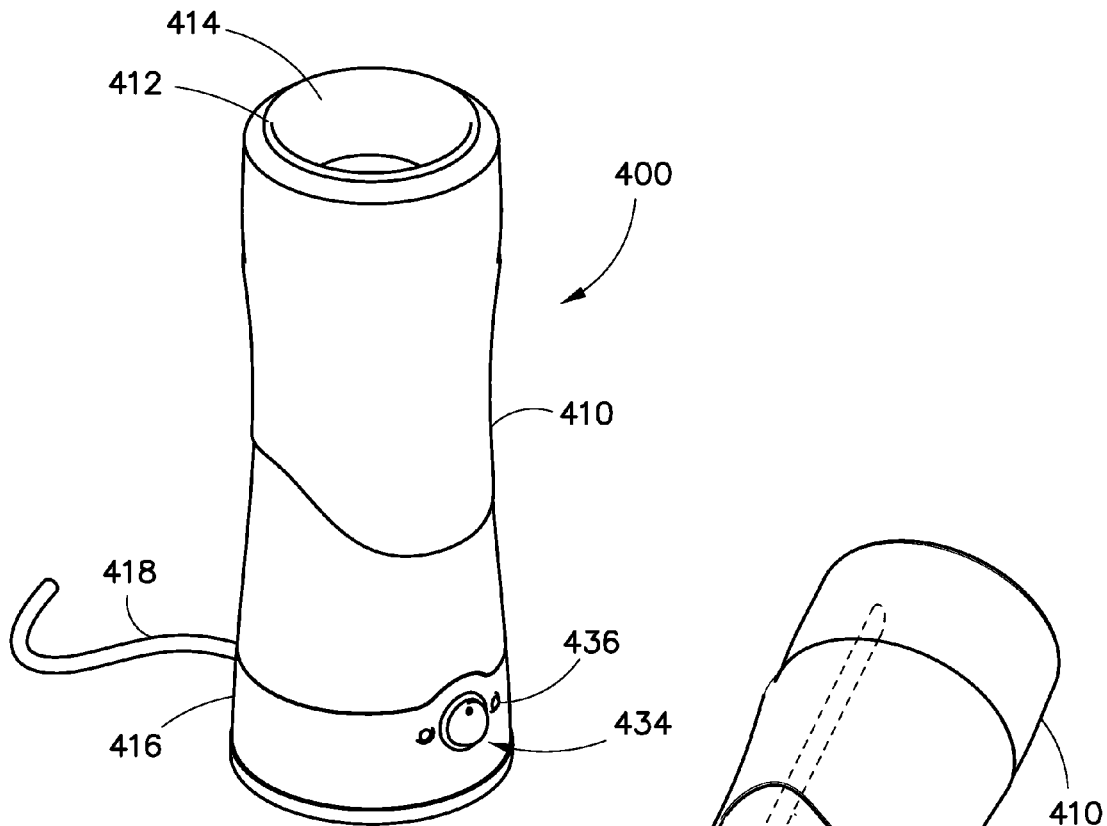
FIGS. 45 and 45A are perspective views of a cooking assembly comprising a mold housing including an integral mold chamber and structured to operatively engage a base assembly.
Figure 45A:
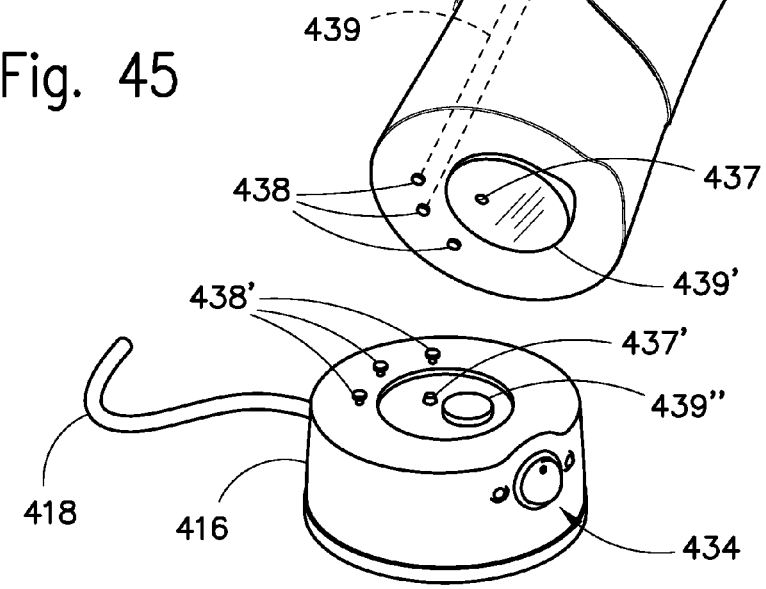

FIGS. 45 and 45A are illustrative of yet another embodiment of a cooking assembly 400 comprising an integral heat source, namely, heating element 439. As shown in the figures, cooking assembly 400 comprises a mold housing 410 having a mold chamber 412 disposed therein. As before, the mold housing 410 and the mold chamber 412 may be integrally formed, or they may be independent structures which are cooperatively constructed yet detachable from one another to facilitate ease of manufacture, cleaning, etc. Mold chamber 412 comprises an open upper end 414 to allow an uncooked food composition to be placed into the mold chamber 412 for cooking, as well as to permit a cooked food product to be removed therefrom. In the illustrative embodiment of FIG. 45A, the cooking assembly 400 comprises a chamber vent 437 which is disposed on a lower portion of the mold housing 410 and extends through the mold housing 410 into the mold chamber 412 itself. The chamber vent 437 serves to prevent a vacuum from forming in the bottom of the mold chamber 412 after a food product has been cooked therein, which may prevent the release of the cooked food product from the mold chamber 412. FIG. 45A further illustrates a vent plug 437' disposed on the base assembly 416, the vent plug 437' being cooperatively structured and disposed to at least partially seal the chamber vent 437 while the mold housing 410 is disposed on the base assembly 416 in an operative orientation, thereby preventing uncooked food from leaking out of the bottom of the mold chamber 412 prior to being cooked.

As noted above, the cooking assembly 400 further comprises a base assembly 416 which is cooperatively structured and disposed to maintain the mold housing 410, and therefore, the mold chamber 412, in a substantially upright configuration while the cooking assembly 400 is disposed in an operative orientation. As with the mold housing 410 and mold chamber 412, the base assembly 416 may be constructed independent of the mold housing 410, as illustrated in FIG. 45A, however, in at least one embodiment, the base assembly 416 is integrally constructed with the mold housing 410, such as is illustrated in FIG. 45.

The cooking assembly 400 further comprises a control assembly 434 which is structured, in part, to regulate an integral heat source, such as heating element 439. The heating element 439 may comprise a resistive heating component disposed in the mold housing 410 adjacent an outer surface the mold chamber 412 in a heat transferring relation. Although illustrated as a single U-shaped loop in FIG. 45A, for purposes of clarity, it is understood to be within the scope and intent of the present invention for the heating element 439 to substantially surround the outer surfaces of the mold chamber 412 so as to provide even cooking temperatures therein. A heating element interconnect 438, 438' is cooperatively structured and disposed on the interface of the mold housing 410 and base assembly 416, respectively, the heating element interface 438, 438' being structured to supply power to the heating element 439, as regulated by the control assembly 434 based on the detection, or lack thereof, of a preselected cooking temperature in or proximate to the mold chamber 412. Alternatively, the heating element 439 may be disposed on the base element 416 proximate the bottom of the mold housing 410, and thus, the bottom of the mold chamber 412, wherein the heating element 439 directs heat upwardly through the bottom of the mold chamber 412.

The control assembly 434, as in various other embodiments of cooking assemblies disclosed herein, comprises at least one indicator 436 structured to provide an indication to a user that the preselected cooking temperature has been attained in or proximate the mold chamber 412. The cooking temperature is monitored via a thermal sensor 439' which is disposed proximate the mold chamber 412 in a temperature detecting relation thereto. In the illustrative embodiment of FIG. 45A, wherein the mold chamber 410 and the base assembly 416 comprise separate, detachable components, a thermal sensor interface 439" is disposed on the base assembly 416 and positioned such that the thermal sensor 439' operatively contacts the thermal sensor interface 439" when the mold housing 410 is disposed in an operative orientation on the base assembly 416. The control assembly 434 and heating element 439 are operatively interconnected to a power supply, such as via power cord 418.

Turning next to FIGS. 51 through 54, there is disclosed yet another embodiment of a cooking assembly 900 in accordance with the present invention having an integral heat source. More in particular, FIGS. 51 through 54 are illustrative of an insulated cooking assembly 900 structured to cook a food product in a substantially upright orientation. As shown best in FIGS. 53 and 54, the insulated cooking assembly 900 comprises an insulated frame assembly 901 comprising at least one outer wall 902 and at least one inner wall 904, wherein the outer wall 902 and the inner wall 903 are cooperatively structured and disposed in an operative configuration to at least partially define an insulated zone 905 therebetween. The insulated zone 905 may simply comprise an air space or vacuum which serves as a buffer to minimize the transfer of heat energy outwardly from the interior of the cooking assembly 900 through the outer wall 902 of the frame assembly 901, however, in at least one embodiment, the insulated zone 905 may be partially or substantially filled with an insulative material to further inhibit the transfer of heat energy from the interior of the cooking assembly 900 through the outer wall 902 of the frame assembly 901. It is further understood that the insulated frame assembly 901 may comprise a plurality of outer walls 902 and/or a plurality of inner walls 904, so defined relative to their proximity to a mold housing 910 and mold chamber 912, discussed in greater detail below. Each of the plurality of outer walls 902 and/or inner walls 904 may be disposed in a spaced apart relation relative to one another, or the plurality of outer walls 902 and/or inner walls 904 may be structured and disposed to form a composite outer wall 904 and/or inner wall 904. In an embodiment having a plurality of outer walls 902 and/or inner walls 904, a plurality of corresponding insulated zones 905 may also be defined therebetween. In at least one embodiment, an overlay 903 may be disposed in an at least partially overlying relation to an exterior surface of outer wall 902, to provide a user a place to grasp the insulated cooking assembly 900, and in at least one further embodiment, the overlay 903 may comprise an insulative material of construction, and in yet another embodiment, the overlay 903 may comprise a handle.

Figure 53:
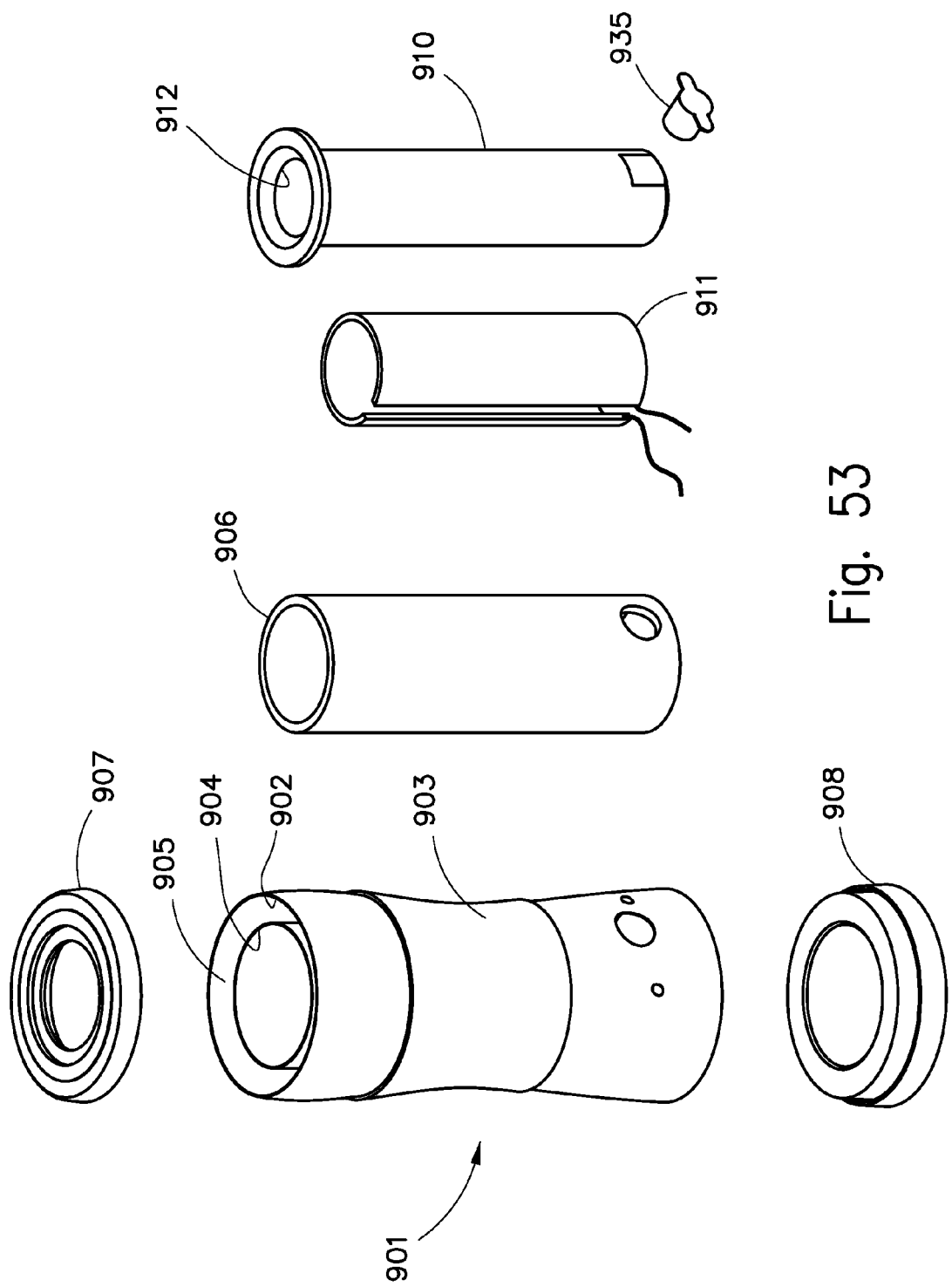
FIG. 53 is a perspective view of the components of another embodiment of an insulated cooking assembly in accordance with the present disclosure.
Figure 54:
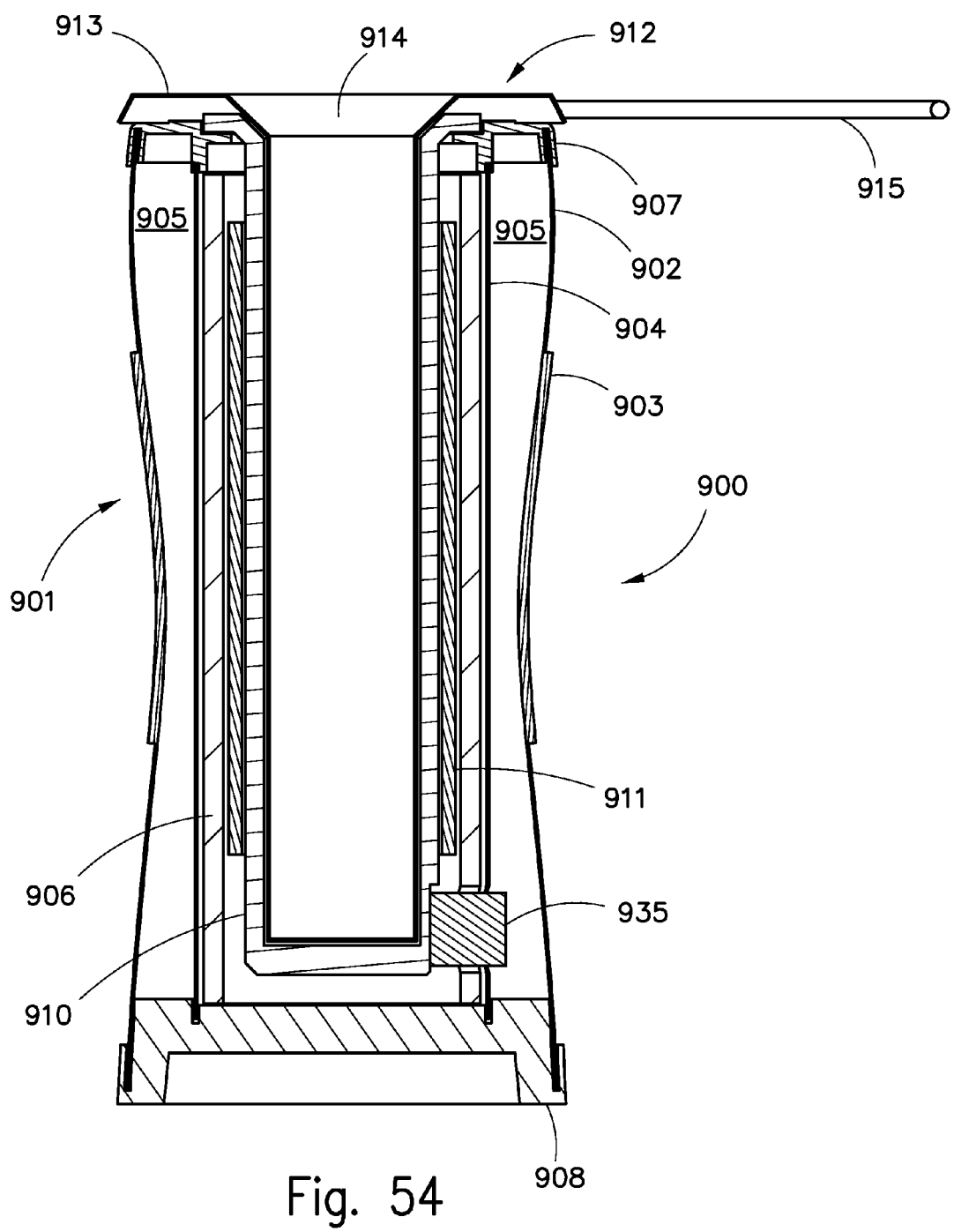
FIG. 54 is a cross-section of the embodiment of the insulated cooking assembly of FIG. 51.

As illustrated best in FIGS. 53 and 54, a cover 907 and base 908 are cooperatively structured to engage the upper and lower portions of the outer wall 903 and inner wall 904, respectively. Although illustrated as separate components in the exploded view of FIG. 54, it is understood to be within the scope and intent of the present invention for one or more components of the frame assembly 901, i.e., outer wall 902, inner wall 904, insulated sleeve 906, cover 907, and/or base 908, as well as mold housing 910 and/or mold chamber 912, to be integrally constructed with one another as may be deemed appropriate and/or dictated by manufacturing process and/or material of construction.

The insulated cooking assembly 900 further comprises at least one mold housing 910, as noted above, constructed of a first thermally conductive material which is structured to facilitate heat transfer therethrough. In the illustrative embodiment of FIGS. 53 and 54, the mold housing 910 is structured to be substantially disposed within inner wall 904. An insulated sleeve 906 is disposed between the inner wall 904 and mold housing 910, as in the illustrative embodiment of FIG. 54, wherein the insulated sleeve 906 is structured to limit the dissipation of heat outwardly through the inner and outer walls 904, 902 of the frame assembly 901, and rather, direct heat energy inwardly towards the mold housing 910, and ultimately, to an uncooked food composition disposed in mold chamber 912.

Figures 51, 52:
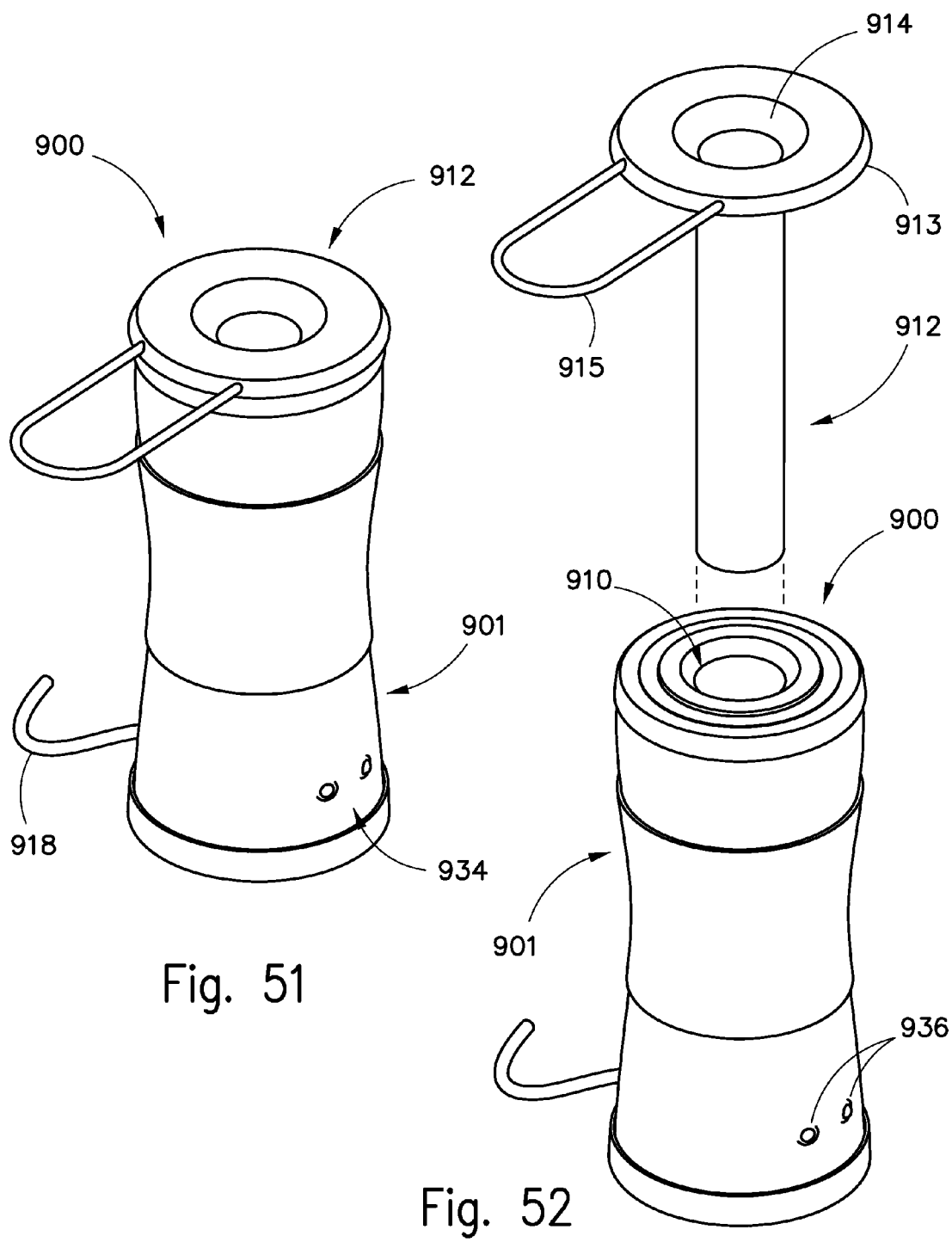
FIG. 51 is a perspective view of one embodiment of an insulated cooking assembly having an insertable mold chamber operatively disposed in a mold housing.
FIG. 52 is a perspective view of the embodiment of the insulated cooking assembly of FIG. 51 illustrating the insertable mold chamber removed from the mold housing.

As in previously disclosed embodiments, a mold chamber 912 is at least partially disposable within the mold housing 910, wherein the mold chamber 912 comprises a second thermally conductive material of construction structured to facilitate heat transfer therethrough. In at least one embodiment, the thermal conductivity of the second thermally conductive material is greater than the thermal conductivity of the first thermally conductive material, so as to minimize the resistance to heat transfer from the mold housing 910 through the mold chamber 912. Of course, in at least one embodiment, the thermal conductivity of the first and second thermally conductive materials may be substantially equivalent, such as in the case where the mold housing 910 and the mold chamber 912 are constructed of similar materials, or wherein the mold chamber 912 is formed integrally with the mold housing 910, as illustrated in FIGS. 52 and 53, which may comprise identical materials of construction.

As disclosed above with respect to various other embodiments of the present invention, the mold chamber 912 has an open upper end 914 structured to receive an uncooked food composition therein, the mold chamber 912 being further structured to retain the uncooked food composition in a substantially upright orientation while the mold chamber 912 is disposed in a substantially upright operative position within the mold housing 910. In at least one embodiment, the mold chamber 912 is removable from the mold chamber 910, and such an embodiment may comprise a chamber handle 915, to facilitate the placement and removal of the mold chamber 912 into and out of the mold housing 910, respectively. Moreover, in embodiments employing a removable mold chamber 912, a support flange 913 may be provided to facilitate positioning the mold chamber 912 in the mold housing 910 in the substantially upright operative orientation.

The insulated cooking assembly 900 further comprises a heat source 911 disposed in an operative relation to at least a portion of the mold housing 910, wherein the heat source 911 is structured to generate and transfer an amount of heat energy to the uncooked food composition in the mold chamber 912. As illustrated in FIGS. 53 and 54, the heat source 911 may comprise a sleeve or jacket structured to surround a substantial portion of the mold chamber 910, thereby providing a uniform heat energy profile along the length of the mold housing 910, and subsequently, along the mold chamber 912 disposed therein. In at least one embodiment, the heat source 911 is disposed between mold chamber 910 and an insulated sleeve 906, such as is illustrated in FIG. 54, as such, the heat generated by the heat source 911 is substantially transferred inwardly to the mold chamber 910, which is constructed of a thermally conductive material, while heat transfer outwardly is impeded by the thermally insulative properties of the insulated sleeve 906.

As in previously disclosed embodiment of the present invention, the insulated cooking assembly 900 comprises a temperature control assembly 934 which is structured and disposed to regulate the output of the heat source 911, in order to maintain an operating temperature of the mold chamber 912 within a predetermined temperature range during a cooking procedure. As before, temperature control assembly 934 may comprise one or more thermal switch 935, such as a bi-metal switch, structured to actuate upon reaching a specific temperature, and to deactivate once the temperature drops below said specific temperature. Such bi-metal switches are employed to provide on/off switching capabilities within very precise temperature ranges, such as are desirable when cooking a food product for short periods of time, as is contemplated by the present invention. As shown in FIGS. 53 and 54, the thermal switch 935 may be disposed in direct contact with a portion of the mold housing 910 to detect a close approximation of the temperature within the mold chamber 912. In at least one further embodiment, a thermal switch 935 may be disposed in direct contact with the exterior, and in one further embodiment, the interior, of the mold chamber 912 itself, in order to provide further accuracy in maintaining the temperature in the mold chamber 912 within a preselected temperature range.

In operation, when the insulated cooking assembly 900 is first turned on, i.e., the mold chamber 912 is at ambient temperature, the thermal switch 935, such as a bi-metal switch, remains closed completing the circuit to provide power to the heat source 911, such as via power supply cord 918. The heat source 911 acts to elevate the temperature of the mold housing 910, and subsequently, the mold chamber 912, until the preselected temperature is attained, at which time the thermal switch 935 is actuated and opened, causing the circuit providing power to the heat source 911 to open, such that power is no longer provided to the heat source 911. Once the temperature of the mold chamber 912 or mold housing 910, as the case may be, drops below the preselected temperature, the thermal switch 935 closes, once again completing the circuit and providing power to the heat source 911, which reheats the mold housing 910 and mold chamber 912 to the preselected temperature. Of course the temperature control assembly 934 can employ a plurality of thermal switches 935, each being actuated and deactuated at different preselected temperatures, thereby providing further temperature control options for operation of the insulated cooking assembly 900. Further, it is envisioned that the thermal switches 935 may be structured to be open while the temperature is below a preselected temperature, with additional electrical components may be provided in the electrical circuit with the power supply and the heat source 911 to complete the circuit and provide power to the heat source 911.

As shown in the figures, the temperature control assembly 934 includes at least one indicator 936, such as a white, red, green, or other color LED, or other visual or audible signal, to alert the user to the temperature within the mold chamber 912. Of course, in at least one embodiment, the temperature control assembly 934 may comprise a plurality of indicators 936, which may include visual indicators of different colors or different audible signals indicative of different predetermined temperatures, as well as operational status of the insulated cooking assembly 900, e.g., a power on indicator. Further examples include an indicator 936 to indicate when the temperature of the mold chamber 912 is below a preselected temperature, above a preselected temperature, or between a plurality of preselected temperatures. In at least one embodiment, the thermal switch 935 may comprise a variable switch mechanism which allows a user to selectively choose a predetermined temperature to be maintained in the mold chamber 912. As such, the user can determine with some precision when the mold chamber 912 of the insulted cooking assembly 900 of the present invention is at the optimum temperature for cooking a specific food product therein.

The versatility of a cooking assembly in accordance with the present disclosure is further evidenced by various structural modifications thereof which may include the additional embodiments as represented in FIGS. 8 through 12. More specifically, a mold housing 44 is at least partially formed from a heat transferable material and differs from the embodiments of FIGS. 1 through 7 by including a plurality of mold chambers 46 on the interior thereof, wherein the actual number of mold chambers 46 may vary. Moreover, the mold housing 44 may be utilized in combination with or independently of a frame assembly 48 including a support platform 49 and at least two spaced apart support stanchions 50. The mold housing 44 may be cooperatively structured with the frame assembly 48 so as to be removably as well as pivotally mounted thereon or connected thereto. As will be appreciated, the mold housing 44 may be readily removed for washing and in at least one embodiment, the mold housing 44 comprises material(s) of construction such that the entire mold housing 44 is dishwasher safe. In yet one further embodiment, an elongated cleaning brush may be provided to facilitate cleaning the interior of the mold chambers 46 of mold housing 44, between uses thereof.

Figure 9:
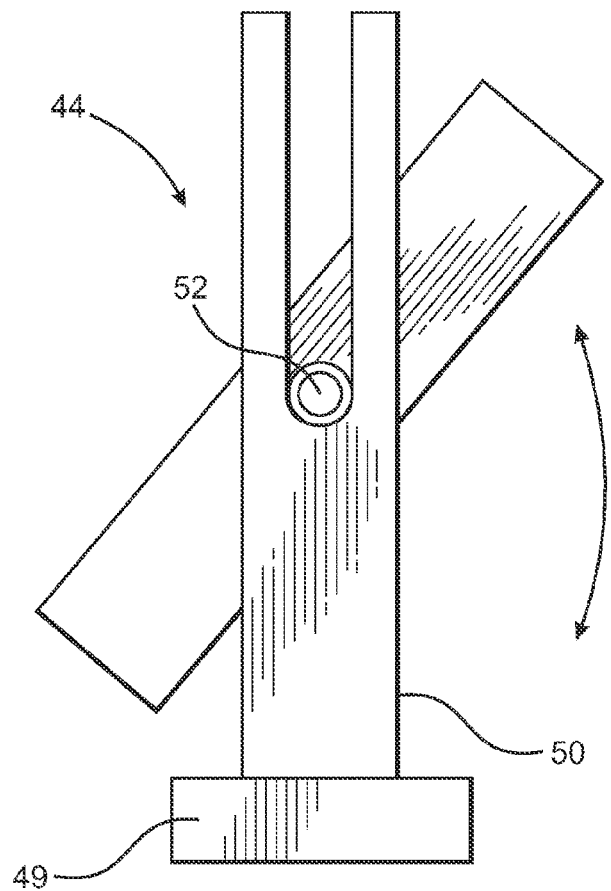
FIG. 9 is an end view of the embodiment of FIG. 8.

The mold housing 44 may include two oppositely disposed outwardly extending fingers or projections 52 intended to be passed within and supported by the bifurcated support stanchions 50 as clearly represented in FIGS. 8 and 9. As such, the mold housing 44 may be selectively moved relative to the frame assembly 48 as well as be removed therefrom. The mold housing 44, in at least one embodiment, assumes the substantially upright orientation at least during the cooking procedure and while the plurality of mold chambers 46 are being filled with an intended food composition. However the orientation or positioning of the mold housing 44 may be varied upon the completion of the cooking procedure. More specifically, a holding or serving plate or like structure, generally indicated as 54, may include a plurality of holding channels 56 disposable in aligned relation with each of the plurality of mold chambers 46. As a result, the removal of the cooked food product is greatly facilitated by disposing the holding structure 54 in a removal orientation relative to the plurality of mold chambers 46 of mold housing 44, as represented in FIG. 8. Such positioning of the holding or serving structure 54 is accomplished orienting it to receive the cooked food products as they are removed from the mold chambers 46 and into the aligned holding channels 56.

Figure 11:
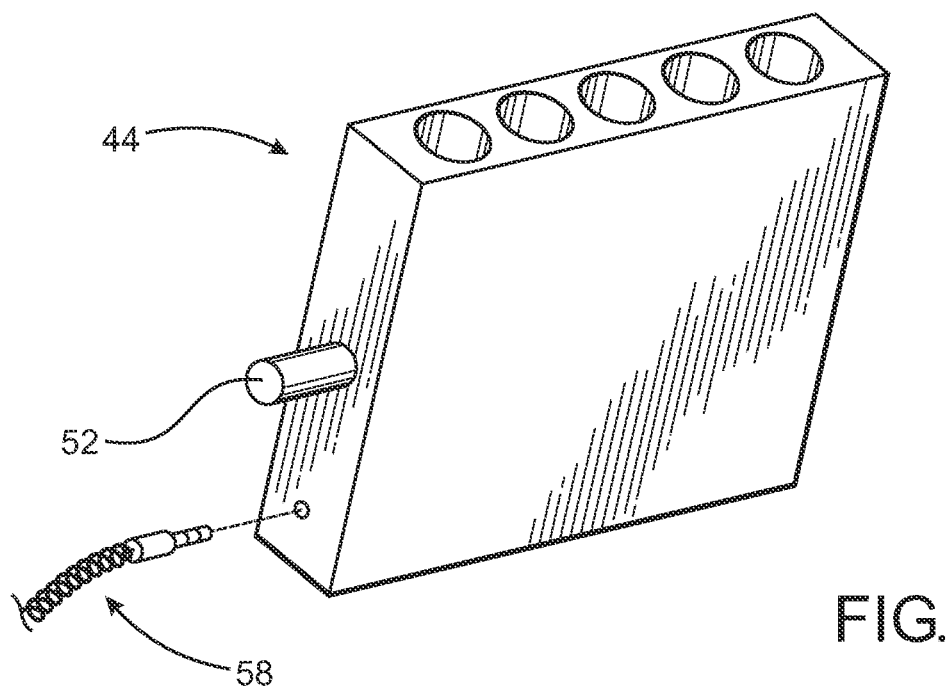
FIG. 11 is a perspective view of yet another embodiment of a mold housing which may be utilized with the frame assembly of the embodiment of FIG. 8.
Figure 12:
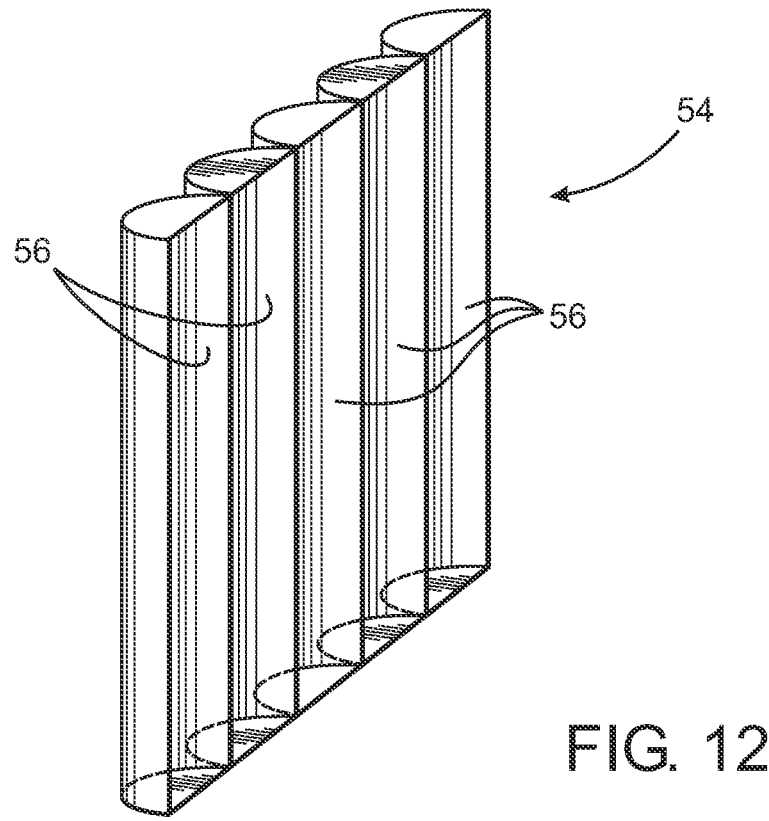
FIG. 12 is a perspective detailed view of a holding or serving portion of the embodiment of FIG. 8.

Further, in this embodiment the required heat source is generally indicated as 57 and may include a plurality of resistance elements integrated within or otherwise connected directly to the mold housing 44. An appropriate electric connection 58 may be utilized to connect the heat source 57 to a conventional source of electrical energy, such as represented in FIG. 11. In at least one embodiment, one or both of the oppositely disposed outwardly extending fingers or projections 52 are cooperatively structured and disposed within the bifurcated support stanchions 50 in an electrically conductive arrangement.

Figure 10:
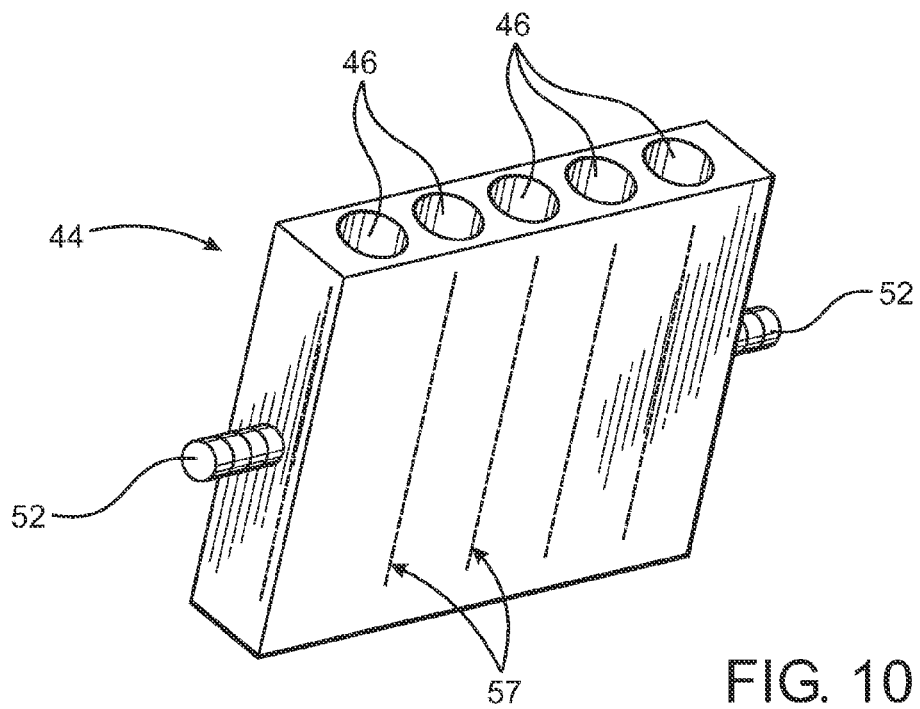
FIG. 10 is a perspective view in detail of the mold housing as represented in FIG. 8.
Figure 13:
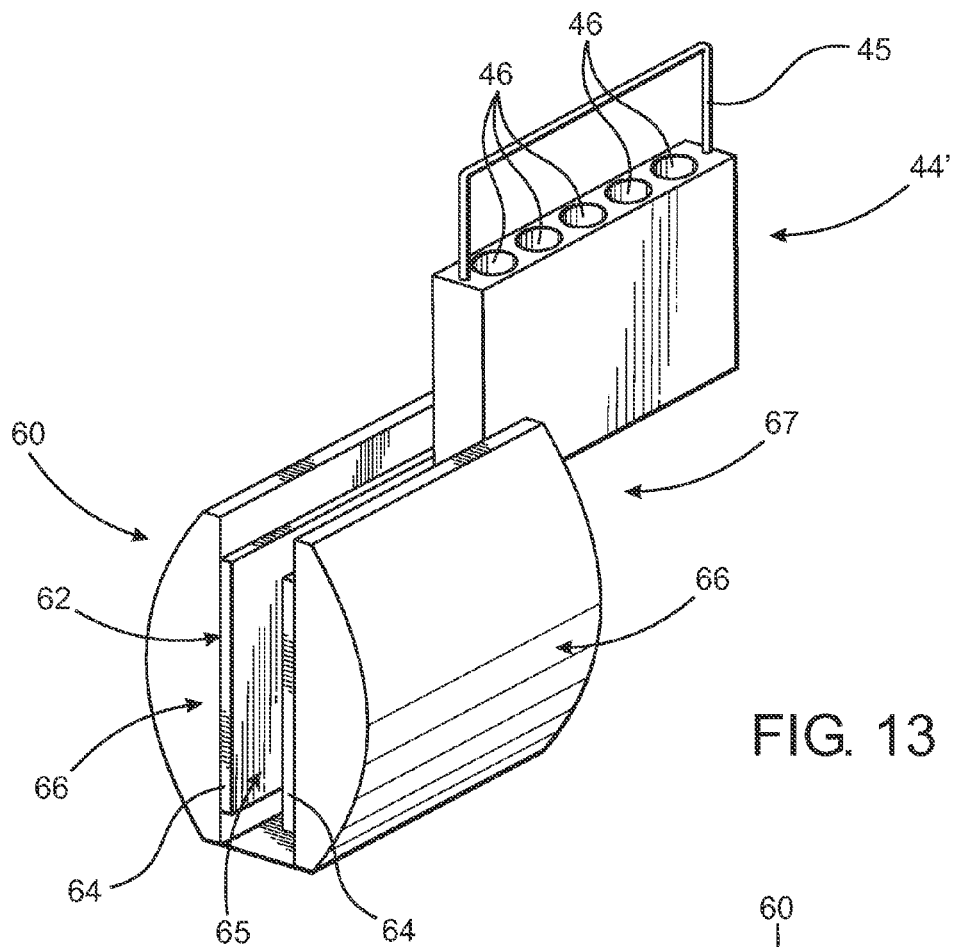
FIG. 13 is a perspective view in partially exploded form of yet another embodiment of a frame assembly and cooperatively structured mold housing to be used therewith.
Figure 14:
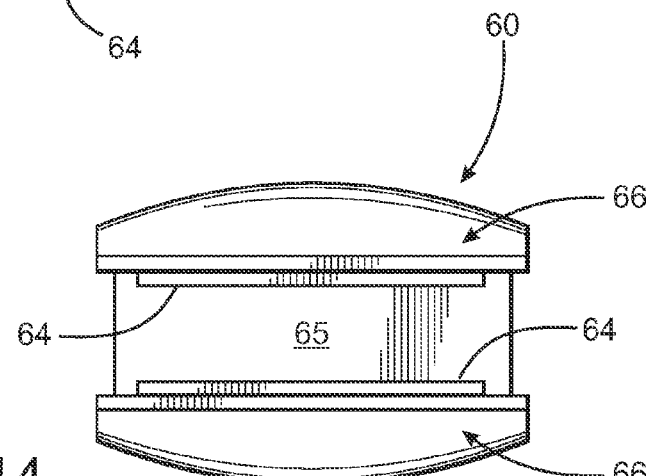
FIG. 14 is a top view of the frame assembly of the embodiment of FIG. 13.
Figure 15:
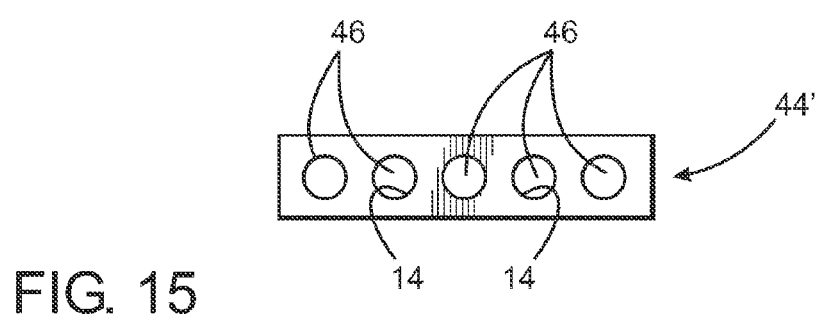
FIG. 15 is a top view of the mold housing of the embodiment of FIGS. 13 and 14.

Additional embodiments are represented in FIGS. 13 through 15, and 16 through 17. More specifically, a mold housing 44', having structural and operative features similar to the embodiment of the mold housing 44 as represented in FIGS. 10 and 11, includes a plurality of mold chambers 46 located therein. However, the mold housing 44' is absent a heat source 57 directly associated therewith. Instead, a frame assembly, generally indicated as 60, is cooperatively structured with the mold housing 44' to support the mold housing 44' in an operative position relative to a heat source 62 integrated within or otherwise connected to the frame assembly 60. In the embodiment of FIGS. 13 and 14, the heat source 62 comprises two spaced apart heat panels or heat plates 64 mounted in substantially overlying relation to the inner surface of frame walls 66. Moreover, a space or distance 65 of predetermined dimension exists between the heating plates or panels 64. This spacing 65 is sufficient to receive the mold housing 44' therein. When so positioned, as schematically represented by directional arrow 67, the opposite sides of the mold housing 44' will be disposed in confronting engagement and/or heat transferring relation to the heating panels or plates 64. Therefore, when the heating panels or plates 64 are activated, sufficient heat will be generated thereby to pass through the heat transferable material from which at least the portion of the mold housing 44' is formed and provide sufficient cooking temperatures to the interior of the mold chambers 46 to quickly and efficiently cook the food composition therein. After the cooking procedure has been completed, the mold housing 44' can be easily removed from the space 65 disposed between the heating plate or panels 64 via handle member 45.

In the embodiment of FIGS. 16 and 17, the mold housing 44" may be used with the frame assembly 60 but may further have additional structural modifications such as a movable and/or removable closure 68 connected to the lower end 15 of the mold housing 44". Also the closure 68 may include one or more sealing and/or closing gasket 69 which, as set forth above with regard to the embodiment of FIG. 2, may comprise a heat resistant, non-stick material and is structured to substantially restrict the leakage or inadvertent passage of liquid or semi-liquid food composition from the interior of the mold chambers 46 through the lower end 15 of the mold housing 44". As yet another alternative, a plug-like stopper, generally indicated as 70, may be used to at least partially seal and/or close the opening associated with the lower end 15 of the mold housing 44" in order to substantially prevent the aforementioned leakage of liquid or semi-liquid food composition from corresponding ones of the mold chambers 46.

Yet additional structural features associated with any one or more of the embodiments of the cooking assembly of the present invention is the provision of a filling structure generally indicated as 72 in FIG. 19. The filling structure 72 may be in the form of a funnel like member which may further include side supports or connector members 74. The members 74 are disposed and structured to facilitate the connection or stable positioning of the filing member 72 in communicating relation the open upper end 14 of any of the plurality of mold chambers 12, 46.

Yet another embodiment of the cooking assembly of the present invention is represented in FIGS. 20 and 21. More specifically, at least one mold housing 80 has similar structural and operational characteristics as the embodiment of FIG. 7, at least to the extent of having a heat source 82 integrated therein or otherwise connected directly thereto. As with the above noted embodiments, the heat source 82 may be in the form of a resistance element connected to a terminal or contact 84. In addition, each mold housing 80 includes a single interior mold cavity 86. The mold housing 80 may be considered to be generally representative of a plurality of mold housings 80', which are independently or collectively connected to a frame assembly generally indicated as 88. Further, each of the mold housings 80 and 80' include their own independent heat source 82 interconnected by the aforementioned contact or terminal portion 84 to the frame assembly 88 and/or to a conventional source of electricity. Additional characteristics of the embodiment of FIGS. 20 and 21 include the respective mold chamber 86 and 86' each be formed with different cross-sectional configurations including by way of illustrative example but not limited to, a star, a circle, a triangle or other multi-sided or curvilinear peripheral configuration, as illustrated best in FIG. 20. In addition to comprising any of a plurality of different shapes, it is further appreciated that the present disclosure anticipates mold chambers, e.g., 12, 46, 86, 86', comprising any of a plurality of overall dimensions or sizes, such that a larger or smaller sized food product may be cooked therein. As just one example, the chamber may comprise additional length so as to approximate the size of a "foot long" hot dog, or be reduced in length such as a "Vienna sausage" size. Similarly, mold chambers having greater or lesser diameters or widths may be utilized to vary the overall dimensions of a finished food product accordingly.

With reference to the additional embodiment of FIG. 22, a mold housing 90 is specifically structured to facilitate the removal of cooked food products from one or each of a plurality of mold chambers 92 formed interiorly of the mold housing 90. Access to the cooked food product, once the cooking procedure is completed, is facilitated by at least one housing section 94 being movable relative to a remainder of the mold housing 90 and/or additional housing section 96. Accordingly, the one housing section 94 and/or both housing sections 94 and 96 may be selectively disposed between the closed position, as represented in FIG. 22, and/or an open position schematically represented by movement of housing sections 94 and 96 in accordance with the directional arrows 93 and 95, respectively. Such movement of the housing section 94 relative to the remainder of the mold housing 90 and/or second housing section 96 is accomplished by a hinge or other pivotal connection extending along the length of the mold housing 90 and thereby at least partially defining what is commonly referred to as a "clamshell" construction. It should be further noted that an appropriate seal or like engaging closure may be present about the junction or seam 98 extending about at least a portion of the periphery of the mold housing 90 between the two housing sections 94 and 96. It is emphasized that the aforementioned "clamshell" construction can be utilized with a mold housing 90 which incorporates a plurality of interior mold chambers 92 or alternatively a mold housing 90 having a single mold chamber 92, as described in the previously disclosed embodiments, in order to facilitate removal of a cooked product from one or a plurality of mold chambers 92.

FIGS. 49 and 49A are illustrative of yet another embodiment of a cooking assembly 800 in accordance with the present invention, wherein the mold chamber 812 comprises an annular configuration, such as, a bagel or doughnut shape. The annular mold chamber 812 comprises an open upper end 814 to facilitate the addition of an uncooked food composition into the mold chamber 812, and a base 816 to support the cooking assembly 800 in a substantially upright orientation. Unlike previously disclosed embodiments of the cooking assembly of the present invention, the cooked food composition may not be removed from the annular mold chamber 812 via the open upper end 814. Rather, and as shown best in FIG. 49A, the annular mold chamber 812 comprises a plurality of chamber sections 813 which are movably positionable relative to one another so as to form an annular cooking volume. The chamber sections 813 may be interconnected to one another, such as via a hinge or pivot member, such as the aforementioned "clamshell" construction, and may be temporarily secured to one another to form the annular cooking volume, such as via a clasp, clip, or other such mechanical fastener for the duration of a cooking process therein. A gasket 818 may be disposed at an interface of the chamber sections 813, so as to minimize leakage of uncooked food product from the annular mold chamber 812.

Yet another embodiment of the cooking assembly of the present invention is represented in FIG. 23 and includes a mold housing 100 having a plurality of interior mold chambers 101 in which a liquid food composition is placed. Similar to the embodiment of FIGS. 1 and 3, this embodiment includes an integrated or self contained heat assembly 102 comprising at least one heating plate or panel 104, which may include a resistance element 105. Alternatively, a plurality of such heating panels or plates 104 and 104' may be disposed on opposite sides of the mold housing 100. As set forth above, the heat source 102, including the one or more heating panel 104 and 104', is operative to generate sufficient heat to supply the required cooking temperature to the interior of the mold chamber 101. In this embodiment it is noted that one or both of the heating panels 104 and 104' extend substantially along the entire length of mold housing 100, such that all of the mold chambers 101 are concurrently heated.

In yet another embodiment of the cooking assembly of the present invention is represented in FIGS. 24 through 27. As such, a mold housing 106 can be at least partially formed from a heat transferable material and includes at least one, but as represented in FIG. 24, a plurality of channels or compartments 107. Each of the compartments 107 is cooperatively dimensioned and configured to removably receive one of a possible plurality of insertable mold chambers 108. Further, each of the mold chambers 108 comprises at least two chamber sections 108' and 108" which are pivotally connected to one another as at hinged portion 110. Alternatively, the chamber section 108' and 108" may be removably attached to one another. Further, a junction or seam 112 is structured to restrict leakage of the liquid, semi-liquid, etc., uncooked food composition from the interior thereof prior to the cooking procedure. The seam or junction 112 may be formed by a tongue and grove configuration as shown at 112' and 112" in FIG. 26 and/or may comprise silicon or other appropriate gasket forming materials. In at least one embodiment, the seam or junction 112 comprises a "quick-connect" type configuration. In use, each of a plurality of the mold chambers 108 are insertable in a different one of the compartments 107 and are filled with the uncooked food composition. An enlarged head portion or upper end 113 is included with each of the insertable mold chambers 108 to facilitate the removal of the mold chambers 108 from their corresponding compartments 107. Such an enlarged head portion 113 may also be dimensioned and configured to facilitate the filling of the interior of the mold chamber 108 with the uncooked food composition. It is understood to be within the scope and intent of the present invention for insertable mold chambers 108 to comprise any of the plurality of shapes and sizes previously disclosed with respect to other mold chamber configurations, as well as comprising any of the materials of construction as disclosed for the same.

Figure 46:
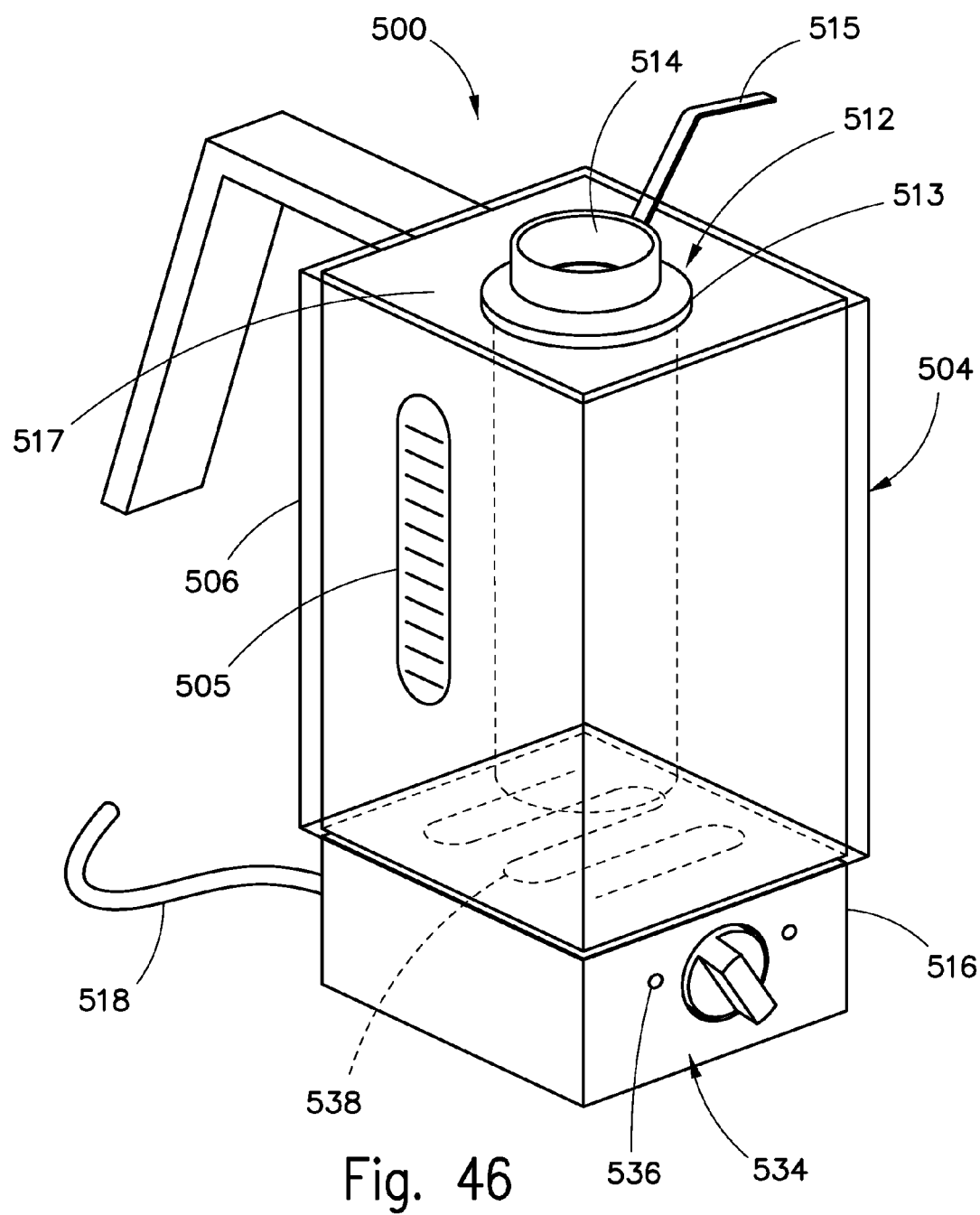
FIG. 46 is a perspective view of one embodiment of a cooking assembly comprising a temperature control bath and having an insertable mold chamber disposed in an operative orientation therein.
Figure 47:
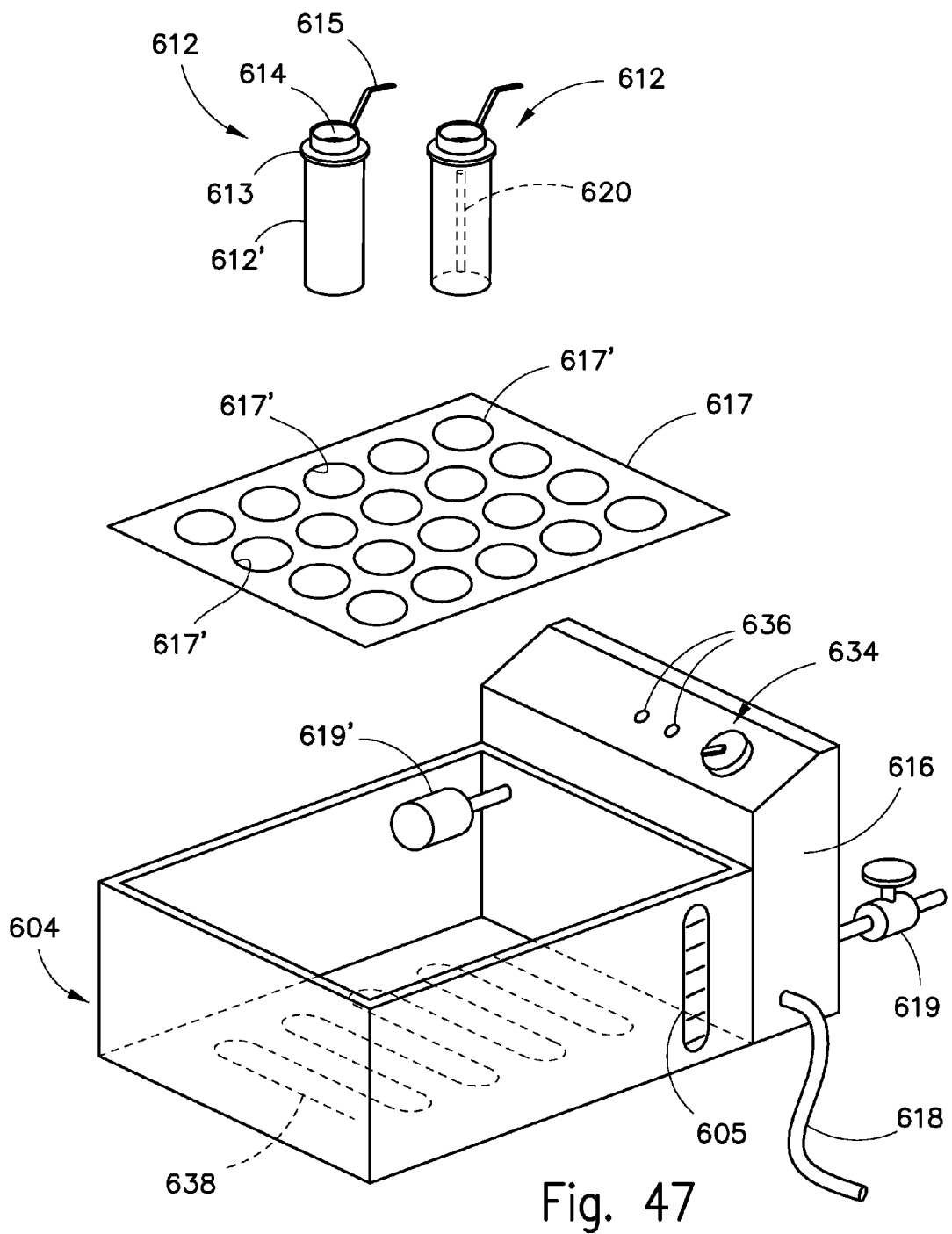
FIG. 47 is a partially exploded perspective view of another embodiment of a cooking assembly comprising a temperature control bath structured to accommodate a plurality of insertable mold chambers therein.

FIGS. 46 and 47 are illustrative of additional cooking assemblies 500 and 600, respectively, which employ an insertable mold chamber 512, 612. A further feature of cooking assemblies 500 and 600 is the utilization of a temperature control bath 504, 604 to provide the heat source for cooking a food product in an insertable mold chamber 512, 612. The cooking assembly 500 of FIG. 46 is structured to allow a user to cook a single food product at a time via a single insertable mold chamber 512, while the cooking assembly 600 of FIG. 47 is structured to allow a user to cook a plurality of food products simultaneously, utilizing a plurality of insertable mold chambers 612.

Looking further to FIG. 46, the cooking assembly 500 includes a base assembly 516 structured to support a temperature control bath 504 thereon. The base assembly 516 in the illustrated embodiment of FIG. 46 includes a control assembly 534 which, as in previously disclosed embodiments, is structured to allow a user to control the cooking temperature of an uncooked food product in a mold chamber, such as, insertable mold chamber 512. A power supply cord 518 may be provided to interconnect the cooking assembly 500 to a power source, for example, a conventional electrical outlet. As further illustrated in the embodiment of FIG. 46, a heat source, such as, by way of example only, heating element 538, is disposed in an underlying orientation to the temperature control bath 504, and is structured to provide heat energy to a heat transfer fluid disposed in the bath 504. Of course, it is understood to be well within the scope and intent of the present disclosure for a heating source, such as heating element 538, to be disposed on or in the temperature control bath 504 itself, and in such case, the heating element 538 may be directly connected to a power source, or may be indirectly connected thereto via the control assembly 534 of the base assembly 516. It is further understood that the temperature control bath 504 and the base assembly 516 may comprise discreet components which are readily separable from one another when not in use, however, in at least one embodiment the temperature control bath 504 and the base assembly 516 comprise an integral construction with one another. A thermal insulation layer 506 may be provided in an overlying relation to at least a portion of the temperature control bath 504 in order to better retain heat energy in an amount of heat transfer fluid disposed therein.

The control assembly 534, 634 may comprise one or more indicator 536, 636 to provide a visual, audible, or other indication to a user that a preselected cooking temperature has been attained in the temperature control bath 504, 604, and in at least one embodiment, in the heat transfer fluid disposed therein. In at least one further embodiment, one or more thermal switch may be employed to allow the control assembly 534, 634 to maintain the heat transfer fluid at or about the preselected temperature in the temperature control bath 504, 604. The heat transfer fluid may be aqueous, such as, distilled water, tap water, salted water, or water having other additives which increase the normal boiling point thereof. The heat transfer fluid may also be non-aqueous, such a cooking oil, fryer oil, etc., such as may be dictated by uncooked food compositions having a further elevated optimum cooking temperature. The temperature control bath 504, 604 may further comprise a level indicator 505, 605, such as a viewing window to allow a user to visually check the level of a heat transfer fluid therein.

As stated above, cooking assemblies 500 and 600 utilize one or more insertable mold chamber 512, 612. Each insertable mold chamber 512, 612 comprises a corresponding open upper end 514, 614 to facilitate the addition of an uncooked food composition therein, as well as for removal of a cooked food product therefrom. The insertable mold chambers 512, 612 further comprise corresponding elongated portions 512', 612' constructed of a thermally conductive material and being structured to extend downwardly so as to be at least partially submerged in an amount of heat transfer fluid within temperature control bath 504, 604, when disposed in an operative orientation relative to cooking assembly 500, 600. In at least one embodiment, insertable mold chamber 512, 612 comprises a chamber handle 513, 613 to facilitate placement into and removal from the temperature control bath 504, 604, and/or a support flange 513, 613 to facilitate positioning and retaining the insertable mold chamber 512, 612 in a substantially upright and operative orientation through the cover 517, 617 of temperature control bath 504, 604. As illustrated best in FIG. 47, mold aperture 617' is formed through cover 617 and is structured to receive the elongated portion 612' of insertable mold chamber 612 therethrough, while preventing the support flange 613 from passing further. A mold aperture is also formed through cover 517 of cooking assembly 500, to receive the elongated portion 512' of insertable mold chamber 512. FIG. 47 further illustrates that in at least one embodiment, insertable mold chamber 612 comprises an internal shaft 620 extending upwardly therethrough. The internal shaft 620 comprises a thermally conductive material and is structured to provide a source of heat energy to the internal portion of a food product being cooked with the insertable mold chamber 612. In at least one further embodiment, the internal shaft 620 comprises a hollow configuration so as to allow the heat transfer fluid to heat the internal shaft 620 from the inside, thereby increasing the heat energy available for transfer to the food product in the insertable mold chamber 612.

Cooking assembly 600 of FIG. 47 is also illustrative of several variations from the embodiment of the cooking assembly 500 illustrated in FIG. 46, for example, the base assembly 612 is disposed along one end of temperature control bath 604 due to the increased volume of the same to permit cooking of a plurality of food products simultaneously therein. As mentioned above, the heat source, such as heating element 638, is disposed directly in or under the temperature control bath 604, and not base assembly 616. Further, and again as a result of the increased volume of the temperature control bath 604, a fill/drain assembly 619 may be provided to facilitate addition and removal of a heat transfer fluid from the temperature control bath 604. Additionally, a level assembly 619' provides a secondary check on the volume or level of heat transfer fluid present in the temperature control bath 604, to assure that sufficient fluid is present, prior to supplying power to a heat source therein.

Figure 27:
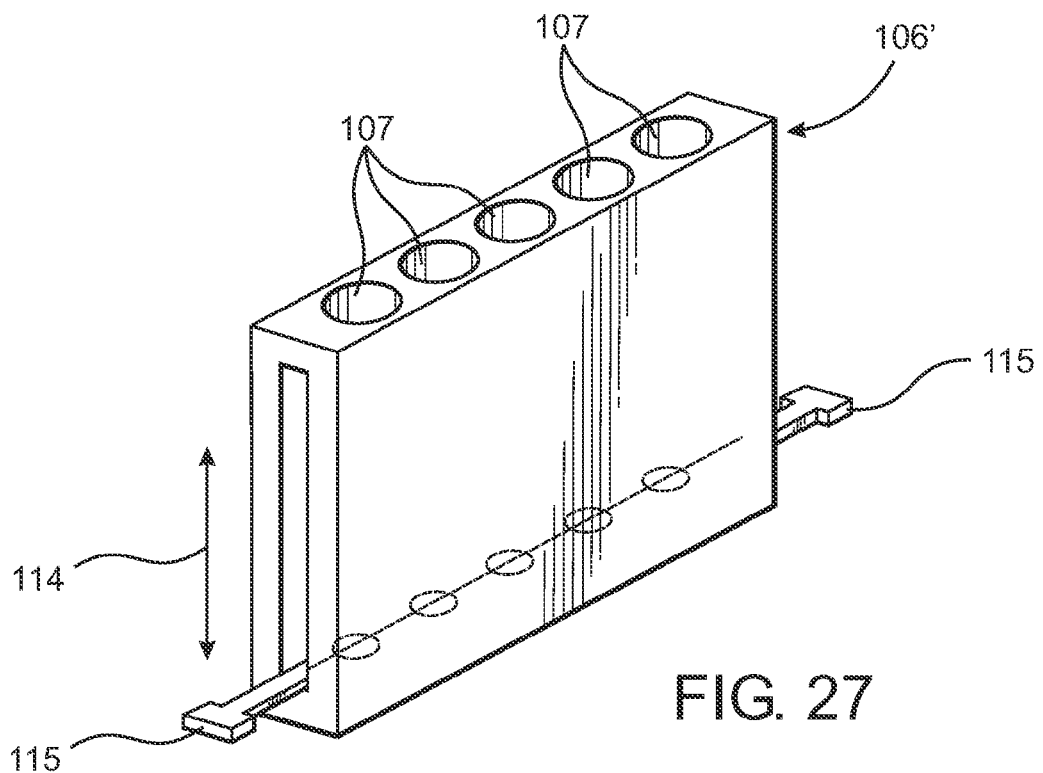
FIG. 27 is yet another embodiment of a mold housing of the type which may be used with one or more of the removably insertable mold chambers as represented in the embodiment of FIGS. 25 and 26.

FIG. 27 represents a structurally modified mold housing 106' also including the plurality of interior compartments 107. As schematically represented by directional arrow 114, the mold housing 106' includes an ejection assembly or mechanism including exterior accessible levers 115 which are reciprocally positionable at least partially within the interior of the modified mold housing 106'. As such, movement of the levers 115 in an upward direction will serve to eject each of the one or more mold chambers 108 disposed within the interior compartments 107. Similarly, location of the levers 115 in a completely lowered orientation, as represented in FIG. 27, will allow the one or more mold chambers 108 to be inserted within any one of the mold compartments 107. In at least one further embodiment, levers 115 may be provided for individual ones of the plurality of mold chambers 107, thereby allowing the user to selectively eject mold chambers as cooking times for various food compositions being cooked in different chambers may vary.

Figure 28:
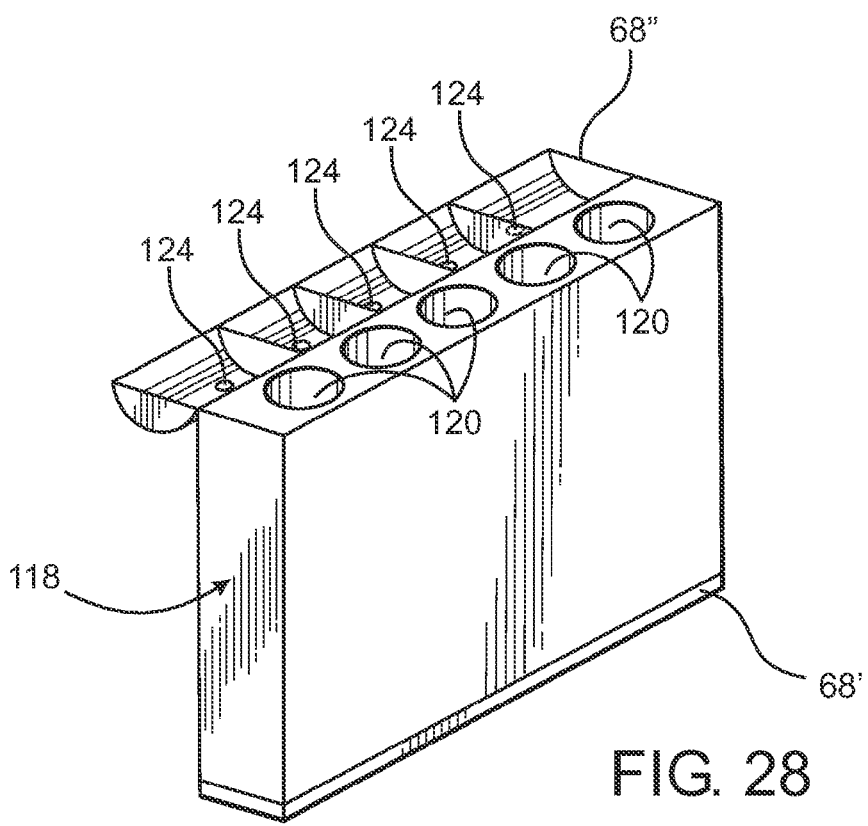
FIG. 28 is yet another embodiment of the mold housing including an associated venting assembly.

With reference next to FIGS. 28 through 30, yet another embodiment of the cooking assembly of the present invention includes a mold housing 118 having a plurality of interior mold chambers 120, each of which includes an open upper end 121 and an open lower end 122. The open lower end 122 may be closed and at least partially sealed using a structure similar to that described with reference to the embodiment of FIGS. 16 and 17. More specifically, a closure 68' may include a gasket 69' structured to be disposed within and at least partially seal and/or close the open lower end 122 in order to substantially prevent or at least restrict leakage of uncooked composition therefrom. The open upper end 121 also includes a modified closure as at 68" which is absent any type of seal or closing gasket as at 69 and 69'. Instead, the closure 68" for the upper open end 121 includes a venting assembly including at least one vent opening 124 disposed in aligned fluid communicating relation with each of the mold chambers 120, as clearly represented in FIGS. 28 through 30. As such, the build up or existence of any excess pressure which may be created and/or accumulated during the cooking procedure is thereby vented through the corresponding vent openings 124 from each of the mold chambers 120. It should be apparent that the same modified upper closure 68" including vent openings 124 may be utilized with a mold housing 10 having only a single interior mold chamber and is not intended to be limited to the mold housing 118 having a plurality of interior mold chambers 120.

With reference to FIGS. 31 and 31A, yet another embodiment of the cooking assembly of the present invention includes a modified vent assembly which differs from the vent assembly of the embodiment of FIGS. 28 through 30. More specifically, mold housing 128 includes a plurality of interior mold chambers 129 having separate, independently operable vent assemblies generally indicated as 130. Each vent assembly 130 is at least partially defined by an elongated channel 132 extending at least partially along the length of a corresponding one of the mold chambers 129. In addition, the spring bias or other sensitive member 133 is located and extends along the length of a corresponding one of the channels 132. As represented in FIG. 31 each of the pressure sensitive members 133 is located in a substantially closed or sealing position such that the interiors of the respective channels 132 are maintained out of fluid communication with the interior of the corresponding mold chambers 129. However, upon a sufficient increase of pressure within the interior of the mold chambers 129, the pressure sensitive members 133 will move to an open position as represented in FIG. 31A. Such an open position will establish fluid communication between the interior of the mold chambers 129 and their respective venting channels 132. As such, excess pressure created during the cooking procedure will be vented from the mold chambers 129 through the venting channels 132 to the exterior of the mold housing 128. It is emphasized that the vent assembly of the embodiments of FIGS. 31 and 31A may be utilized with a mold housing 10 having a single or lesser amount of mold chambers than that represented in the embodiment of FIGS. 31 and 31A.

Figure 32:
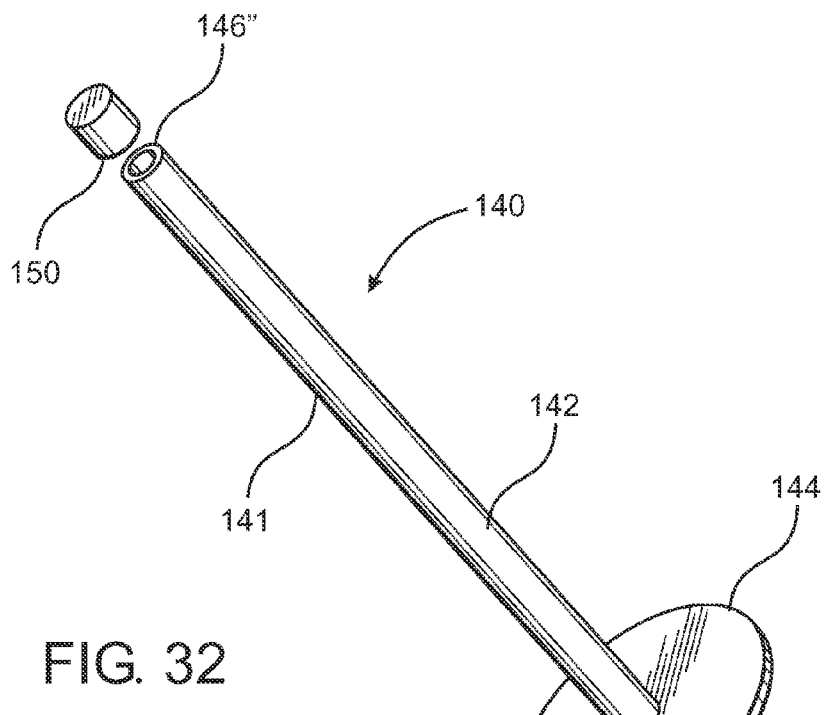
FIG. 32 is a perspective view of yet another embodiment of a vent assembly which may be utilized with a plurality of different embodiments of the mold housings and/or mold chambers of the present invention.
Figure 33:
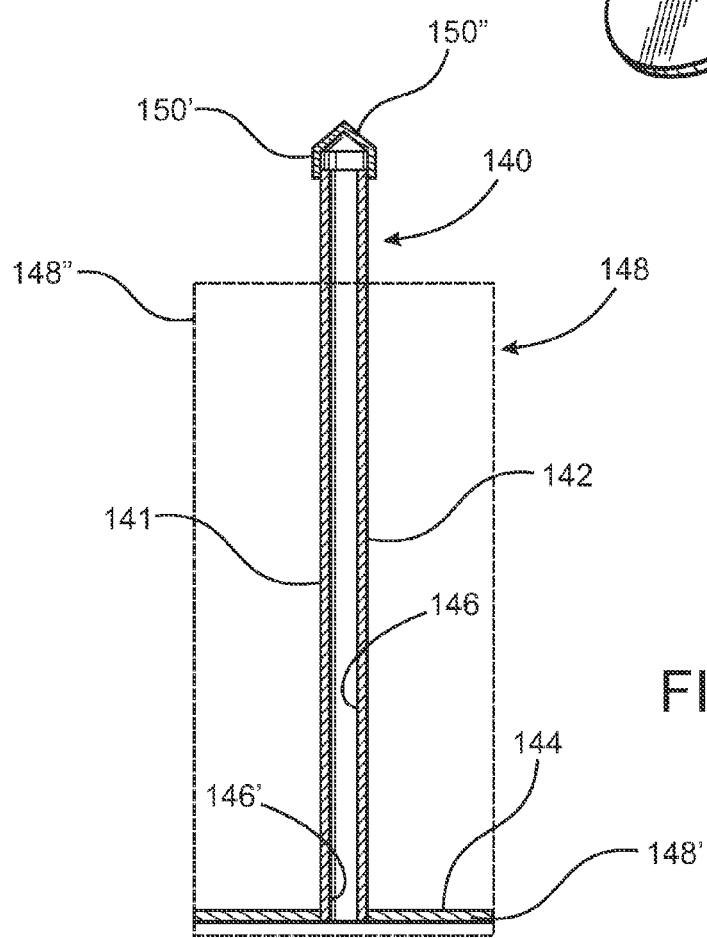
FIG. 33 is an interior view in partial phantom of the vent assembly of the embodiment of FIG. 32 disposed in an operative orientation in a mold chamber.

An additional variation of the vent assembly from that described in the embodiments of FIGS. 28 through 31A, is represented in FIGS. 32 and 33. Such a vent assembly 140 includes an insert member 141 including an elongated stem 142 and a somewhat enlarged support platform 144. As represented in FIG. 33, the stem 142 includes a hollow interior serving to define an elongated channel 146 extending along the length of the stem 142. Once inserted within the interior of a mold chamber 148 the support platform 144 will be disposed adjacent the lower end 148' of the mold chamber 148 and the upper end of the stem 142 will be disposed so as to extend outwardly above the upper end 148" of the mold chamber 148. The interior of the channel 146 will be disposed in fluid communication with the interior of the mold chamber 148 by means of an opening 146' formed in the lower end of the stem 146 so as to pass through the support platform 144. Somewhat similarly, the upper end of the stem 142 is also open as at 146". Accordingly during the cooking procedure, the build up or creation of any excess pressure will pass from the interior of the mold chamber 148 through the opening 146' and the lower end of the stem 146. The excess pressure will continue to travel upwardly along the interior of the channel 146 and eventually exit the exterior of the chamber 148 and the mold housing with which it is associated.

The vent assembly 140 is placed on the interior of the mold chamber 148 prior to the introduction of the uncooked food composition therein. Accordingly a closure or cap member 150 may be used to cover the open upper end 146 in order to avoid the inadvertent filling or passage of the uncooked food composition into the interior of the channel 146 during the filling of the mold chamber 148. Once the mold chamber 148 has been filled the cap 150 may be removed to facilitate the venting of any excess pressure, as at forth above.

Yet another operative feature of the vent assembly 140 is its possible use as a "skewer" type structure wherein solid pieces of food are positioned along the length and on the exterior of the stem 142 prior to the uncooked liquid food composition being placed into the interior of the mold chamber 148. As such, the skewered food pieces will be disposed or "submerged" in the interior of the cooked food product, once the cooking procedure has been completed. In addition, the closure or cap 150' may be at least partially pointed as at 150" in order to further facilitate penetration of the aforementioned food pieces and the positioning thereof at various locations along the exterior of the stem 142. Further, once the cooking process is completed, the upper end of the stem 142 may be grasped to facilitate removal of the cooked food product from a corresponding mold chamber.

A further operative feature of such the "skewer" type structure of vent assembly 140 is use as a push rod to facilitate packing solid and/or semisolid food compositions, such as ground meat, into one or more mold chamber. Alternatively, a separate "skewer" and/or "push rod" may be provided which does not possess the pressure relief functions of vent assembly 140.

Alternatively, and as illustrated in FIGS. 45A and 50, a vent 437, 218 is disposed along the bottom portion of corresponding mold housing 410 or mold chamber 212, respectively. The bottom "vents" illustrated in FIGS. 45A and 50 are merely open passages which allow the unimpeded flow of fluid therethrough. In fact, in the embodiment of FIG. 50, the vent 218 is structured to permit the free flow of grease generated in the mold chamber 212 during a cooking procedure into a grease chamber 219 disposed between base 216 and mold housing 210. It is understood, however, to be well within the scope and intent of the present invention to incorporate one or more pressure relief device, such as a pressure relief valve or vacuum break, in vent 437 or 218, as well as any other vent disclosed herein, to allow a corresponding mold housing or mold chamber to vent at a preselected pressure, such as is dictated by a pressure rating of such a pressure relief or vacuum break device.

Now that the various structural embodiments of an assembly for cooking elongated food products have been described, below are some exemplary procedures for cooking liquid, semi-liquid, semi-solid and solid foods utilizing the assembly as disclosed herein.

Whether utilizing a stand-alone mold housing 10, such as is illustrated in FIGS. 4 through 7, or a mold housing 10 structured to be disposed in a frame assembly 16 or 16', such as illustrated by way of example in FIGS. 1 and 3, respectively, the first step, after assuring the lower open end of the mold chamber 12 is appropriately sealed, is to preheat the mold chamber 12 to the desired temperature for the food composition to be cooked. In an embodiment comprising a control assembly 34, the visible and/or audible indicators, such as a flashing light or alarm, will indicate to the user when the desired preheat temperature has been attained. As before, in at least one embodiment, the control assembly 34 may comprise a timer, temperature indicator, or other such indicators to facilitate ease of operation of the present invention.

EXAMPLE 1

Sausage and Egg Wrap

Figure 34A:
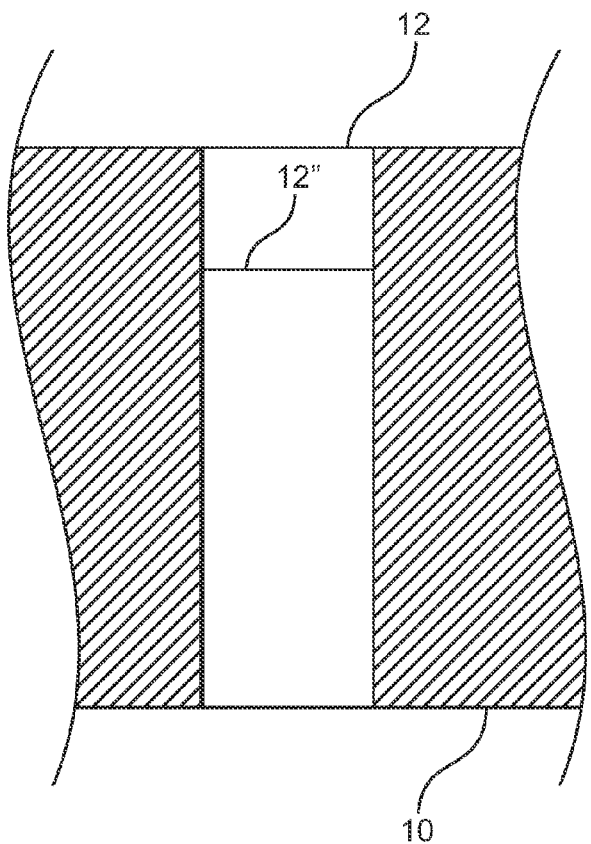
FIGS. 34A through 34E are a schematic representation of one embodiment of a process for preparing a food product in accordance with the present disclosure.
Figure 34B:
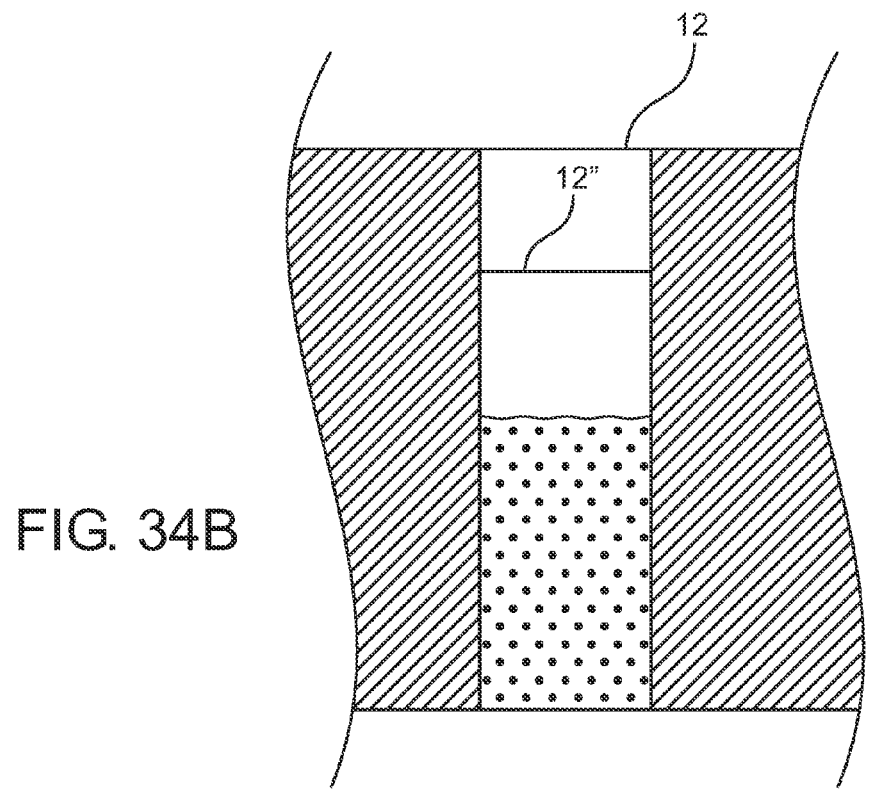
Figure 34E:
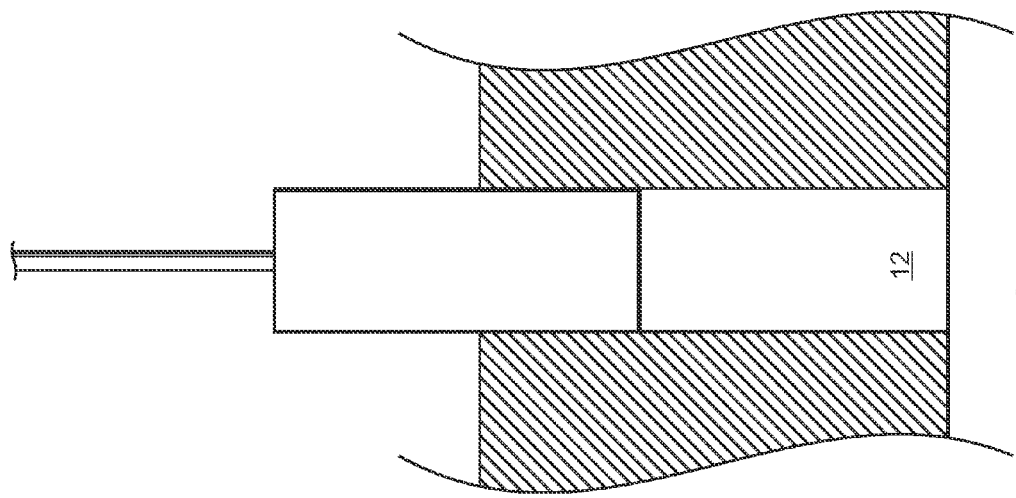
Figure 34D:
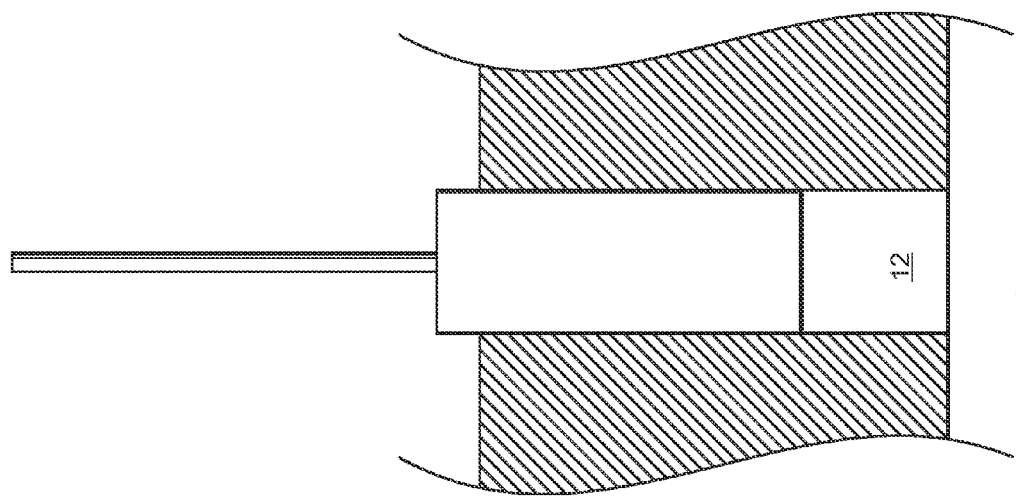
Figure 34C:
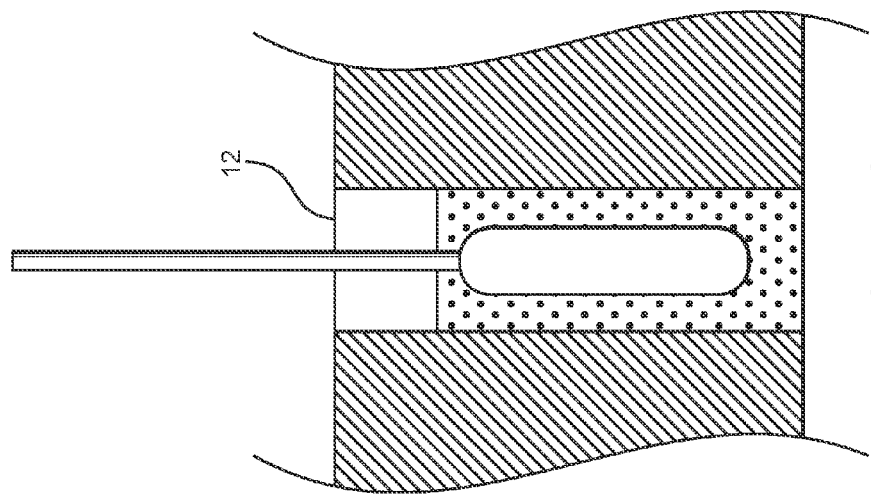

With reference to FIGS. 34A through 34E, the following is an example of how the present invention is utilized to prepare a sausage product wrapped in a layer of cooked egg. As show in FIG. 34A, the mold chamber 12 is initially empty, with fill indicator line 12" clearly visible therein. Preheat the mold chamber 12 to a temperature of between about 200° and 275° Fahrenheit, at which time, the inside of the mold chamber 12 may be coated with a non stick cooking spray. Add one or more egg into the mold chamber 12 until the volume of uncooked egg is about half way to the level of the fill indicator line 12", as shown in FIG. 34B. It is understood that more than one fill indicator line 12" may be provided in the mold chamber 12 so as to provide an indication of the proper fill level for any of a wide variety of liquid, semi-liquid, semi-solid and/or solid food compositions therein. A filling structure 72 as disclosed above may be inserted into the upper open end of mold chamber 12 to facilitate adding one or more egg into the mold chamber 12. It has been determined that allowing eggs to naturally fall into the mold chamber 12 without agitation or mixing results in a more aesthetically pleasing appearance of the final cooked food product. Next, a sausage product, for example, a hot dog, turkey dog, breakfast sausage link, etc., is skewered along its length to about the center, with care taken not to pierce through the entire length of the sausage, and the loaded skewer is inserted into the egg product in the mold chamber 12, preferably centered in the eggs, as is illustrated by way of example in FIG. 34C. In at least one embodiment, the one or more egg is allowed to cook for a short period of time, for example, 10 to 15 seconds, prior to inserting the sausage into the same, which allows the egg to form and better support the sausage therein. In one further embodiment, the sausage is cooked prior to addition into the egg or eggs in the mold chamber 12. As previously stated, in at least one embodiment, the solid food component, such as the sausage, may be feely added into the egg product without a skewer or other support means. It has been discovered that while cooking certain food products in the novel cooking assembly disclosed herein, pressure builds up in the bottom of the chamber causing many food products to begin to rise upwardly and outwardly from the mold chamber during the cooking process, as illustrated in FIG. 34D. Although this is an undesirable in certain applications, and as such, vent assembly 140 was devised, it has further been discovered that when cooking certain food products, such as the present sausage and egg wrap product, the pressure is sufficient to eject the cooked food product approximately half way up and out of the mold chamber 12, as shown in FIG. 34D, after about 6 to 8 minutes of cooking time. More importantly, at this point the cooked food product is ready to be manually removed from the mold chamber, such as by grasping and gently pulling the end of the skewer, and eaten. FIG. 35 is illustrative of a cooked sausage and egg wrap product cooked in accordance with the present example, and FIG. 36 is a further illustration of the same cut in half to demonstrate an even layer of egg surrounding the sausage product, such as is easily and repeatedly achievable with the present invention.

EXAMPLE 2

"Egg" Roll

As before, the mold chamber 12 is preheated prior to the addition of one or more eggs to the mold chamber 12, and also as in Example 1, filling structure 72 may be inserted into the upper open end of mold chamber 12 to facilitate adding one or more egg into the mold chamber 12, allowing them to flow freely into the preheated mold chamber 12 up to the fill indicator line 12". In at least one embodiment, the mold chamber 12 is preheated to a temperature of between about 200° and 275° Fahrenheit, at which time, the inside of the mold chamber 12 may be coated with a non stick cooking spray. As noted in Example 1, the egg roll product will rise out from the mold chamber 12 as cooking progresses, and the mold housing 10 and/or mold chamber 12 may be inverted to remove the cooked egg roll shaped product, or tongs may be utilized to gently remove it the remainder of the way from the mold chamber 12 after is has fully cooked, which will be between about 6 to 9 minutes. FIG. 37 is illustrative of just a few of the plurality of geometrical configurations into which eggs, or other liquid, semi-liquid, semi-solid, or solid food composition may attain upon cooking in accordance with the assembly of the present disclosure.

As an alternative to a plain egg roll product, an omelet roll may be formed by adding favorite vegetables, such as, by way of example only, cherry tomatoes, cucumber, spinach, mushrooms, peppers, onions, etc., and/or meat products such as diced ham, bacon, ground sausage, etc., and/or cheese products, into the mold chamber either before or after the egg(s) have being added, or they may be added to the mold chamber at the same time as the egg(s).

EXAMPLE 3

Marbled "Egg" Roll

Figure 38:
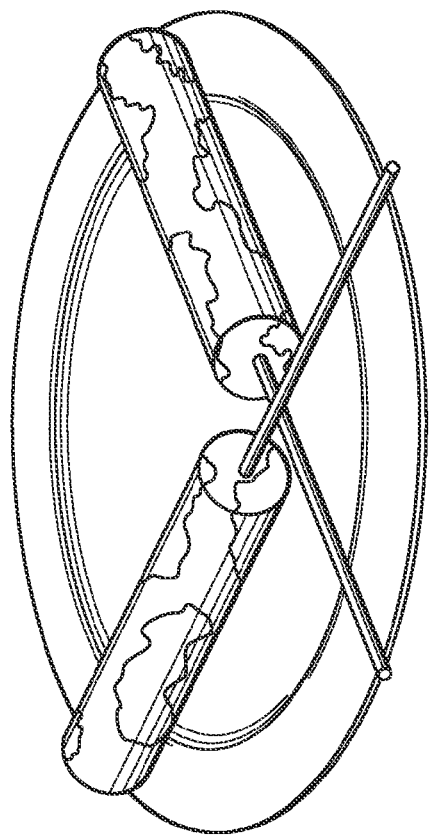

Preheat the mold chamber 12 to a temperature of between about 200° and 275° Fahrenheit, at which time, the inside of the mold chamber 12 may be coated with a non stick cooking spray. Separate one or more eggs into egg yolks and egg whites, and add the egg yolks to the preheated mold chamber 12, and then add the separated egg whites on top up to the fill indicator line 12". As in the previous examples, the "marbled" egg product will rise from the mold chamber 12 and is removed upon completion of the cooking as above, in about 6 to 9 minutes. FIG. 38 is illustrative of "marbled" eggs prepared in accordance with the present example utilizing the assembly as disclosed herein, having distinct and segregated cooked egg yolks and cooked egg whites randomly dispersed throughout.

EXAMPLE 4

Ground Meat Roll

It has been discovered that when cooking meat and meat products, the use of a non-stick cooking spray may be helpful to facilitate even cooking and removal of the finished cooked food product, depending on the fat content of the meat product being utilized. A ground meat mixture, e.g., ground beef, ground turkey, ground chicken, etc., is added to the preheated mold chamber 12 via an injector or a push rod up to the fill indicator line 12". Once the ground meat is in position in the mold chamber 12, which is preheated to a temperature of between about 300° and 350° Fahrenheit, a skewer is inserted lengthwise through the center of the ground meat product about half way into the mold chamber 12. As in the previous examples, as the ground meat product cooks, it will begin to rise out of the mold chamber 12, and once it reaches a point about half way out of the mold chamber 12, after about 5 minutes, it may be gently removed the rest of the way via the skewer, and served.

EXAMPLE 5

Filled Pancake Roll

Figure 39:
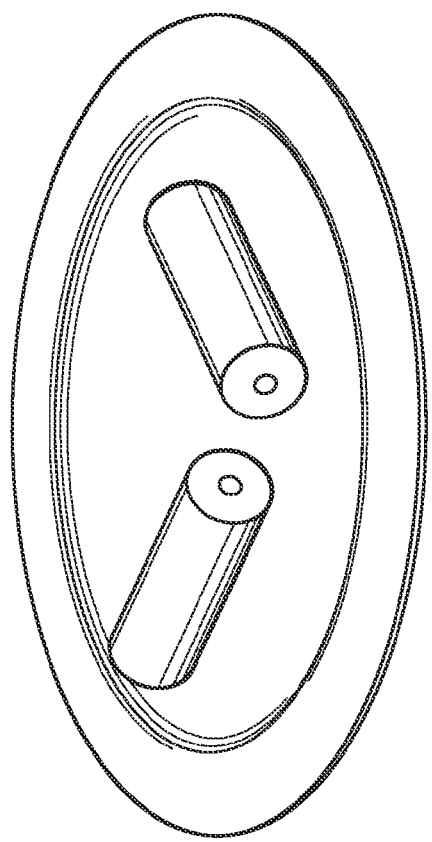

As in Example 4, when cooking pancake rolls, or other baked good batter products, the use of a non-stick cooking spray into the preheated mold chamber 21 has been found useful to facilitate the cooking and removal processes. Insert the vent assembly 140 into the preheated mold chamber 12, making certain that end cap 150 is in position. Using filling structure 72, add a desired pancake mixture into the mold chamber up to the fill indicator line 12", at which point, end cap 150 is removed from the end of vent assembly 140. After a predetermined cooking time (see pancake mix instructions for recommended cooking time and temperature), remove cooked pancake roll from the mold chamber 12 via vent assembly 140, and remove pancake roll from vent assembly 140 and place onto plate. A favorite syrup, e.g., maple, honey, fruit, chocolate, is squeezed into the void formed through the center of the pancake roll by elongated stem 142 of vent assembly 140, thereby resulting in a filled pancake roll, such as is illustrated by way of example in FIG. 39.

EXAMPLE 6

Formed Rice Roll

Add a mixture of precooked white or brown rice and egg whites into the preheated mold chamber 12 up to the fill indicator line 12". Additional ingredients as may be desired can be added to the mixture prior to adding to the mold chamber 12. As in Example 4, a skewer may be inserted lengthwise through the center of the rice/egg mixture about half way into the mold chamber 12. As in the previous examples, as the rice/egg mixture product cooks, it will begin to rise out of the mold chamber 12, or it may be gently removed via the skewer, and served.

EXAMPLE 7

Vegetarian "Egg" Roll

This example is similar to Example 1, except, in place of a sausage product, the skewer is loaded with favorite vegetables, such as, by way of example only, cherry tomatoes, cucumber, spinach, mushrooms, peppers, onions, etc., and the loaded skewer is inserted into the uncooked eggs in the mold chamber 12. As above, the vegetarian egg roll will at least partially rise out of the mold chamber 12 upon cooking, and the skewer is utilized to remove it the remainder of the way for serving.

EXAMPLE 8

Corn Bread Roll

Preheat the mold chamber 12 to a temperature of between about 300° and 350° Fahrenheit, and, as in several previous examples, a non-stick cooking spray may be added to the mold chamber 12, which is then preheated. Add corn bread mix using filling structure 72 up to the fill indicator line 12". After approximately 3 to 5 minutes, insert skewer to test if center is dry, if so corn bread roll is ready to eat. If desired, additional cooking time may be used to provide product with additional crust on the outside.

EXAMPLE 9

Corn Bread Dog

Preheat the mold chamber 12 to a temperature of between about 300° and 350° Fahrenheit. As above, a non-stick cooking spray is added to the mold chamber 12, which is then preheated. Insert a pre-cooked food product, such as a hot dog, into mold chamber 12 to allow the hot dog to heat up and at least partially cook, and remove hot dog. Add corn bread mix using filling structure 72 to a point about half to the fill indicator line 12", allow the corn bread mix to cook for about 10 seconds, to allow it to form, and reinsert hot dog centered in the corn bread mix into the mold chamber 12 via the skewer. Allow approximately 3 to 5 minutes further cooking, and remove the corn bread dog via the skewer and serve.

In one alternate embodiment, a ground meat roll, prepared as above, is substituted for the hot dog in the present recipe to from a "corn burger", and in one further alternate embodiment, an egg roll prepared in accordance with one of the foregoing recipes is inserted into the corn meal mix in place of the hot dog to form a "Corn egg."

As will be appreciated for the foregoing examples, the food products which may be prepared utilizing the new and novel cooking assembly of the present disclosure are practically limitless. Just a few examples of additional food products which have been prepared in accordance with the present disclosure include falafel, cake mix, waffle mix, baked goods, other egg combinations, and tofu. Additionally, an internal shaft, such as 220, may be disposed in the mold chamber 12 prior to adding the uncooked food composition, such that the cooked food product has a cylindrical opening extending through the middle which may be filed with any form of condiments, etc. Further, the cooked food products may be formed into any of a plurality of shapes, such as is demonstrated by the wide variety of mold chamber configurations disclosed herein. It is also deemed to be within the scope and intent of the present disclosure to encompass cooked food products utilizing the recipes presented herein adapted for mass production utilizing presently known food processing techniques. Further, while some food products contain sufficient grease or oil such that the use of a non-stick cooking spray is not required, it is desirable, though not required, of other products. Similarly, not all foods generate sufficient pressure so as to cause the food product to rise from the mold chamber 12 upon cooking, however, this has been found to be a good indicator of the completion of a cooking cycle for many food products tested.

Since many modifications, variations and changes in detail can be made to the described embodiments of the invention, it is intended that all matters in the foregoing description and shown in the accompanying drawings be interpreted as illustrative and not in a limiting sense. Thus, the scope of the invention should be determined by the appended claims and their legal equivalents.

Now that the invention has been described.

What is claimed is:

1. A cooking assembly structured to cook a food product in a substantially upright orientation, said assembly comprising:
    a frame assembly,
    at least one mold housing operatively mounted in an upright position in said frame assembly,
    at least one mold chamber, wherein at least a portion of said mold chamber is disposed in said mold housing,
    said mold chamber having an open upper end structured to receive a food composition therein, said mold chamber further structured to retain the food composition in a substantially upright orientation while said mold chamber is disposed in an operative upright position,
    a heat source disposed in an operative substantially surrounding relation to said mold housing thereby creating a uniform heat energy profile along a length of said mold housing, said heat source generates and transfers an amount of heat energy to the food composition in said mold chamber,
    an insulated sleeve operatively disposed in a substantially surrounding relation to said heat source, said insulated sleeve positioned between said heat source and said frame assembly, and
    said insulated sleeve comprising a thermally insulative material structured to inhibit heat transfer therethrough, whereby said amount of heat energy generated by said heat source is substantially transferred inwardly into said mold chamber.

2. The assembly as recited in claim 1 wherein said mold chamber is structured to impart a predetermined configuration to the cooked food product produced during the cooking procedure.

3. The assembly as recited in claim 1 wherein said mold chamber is integrally constructed with said mold housing.

4. The assembly as recited in claim 1 wherein said mold chamber comprises an insertable mold chamber structured to be removably disposable into said mold housing.

5. The assembly as recited in claim 1 further comprising a temperature control assembly structured to regulate said heat source and maintain an operating temperature of said mold chamber within a predetermined temperature range during a cooking procedure.

6. The assembly as recited in claim 5 wherein said temperature control assembly comprises at least one thermal switch disposed in an operative engagement with at least a portion of said mold housing.

7. The assembly as recited in claim 6 wherein said thermal switch comprises a bi-metal material.

8. The assembly as recited in claim 5 wherein said temperature control assembly comprises a timer.

9. A cooking assembly structured to cook a food product in a substantially upright orientation, said assembly comprising:
    a frame assembly,
    at least one mold chamber comprising a thermally conductive material structured to facilitate heat transfer therethrough operatively mounted in an upright position in said frame assembly,
    said mold chamber having an open upper end structured to receive a food composition therein, said mold chamber further structured to retain the food composition in a substantially upright orientation while said mold chamber is disposed in said upright position in said frame assembly, and
    a heating element disposed in an operative surrounding relation to said mold chamber thereby creating a uniform heat energy profile along a length of said mold chamber, said heating element generates and transfers an amount of heat energy to the food composition in said mold chamber.

10. The assembly as recited in claim 9 wherein said mold chamber is structured to impart a predetermined configuration to the cooked food product produced during the cooking procedure.

11. The assembly as recited in claim 9 further comprising a temperature control assembly structured to regulate said heating element and maintain an operating temperature of said mold chamber within a predetermined temperature range during a cooking procedure.

12. The assembly as recited in claim 11 wherein said temperature control assembly comprises at least one thermal switch disposed in an operative engagement with at least a portion of said mold chamber.

13. The assembly as recited in claim 12 wherein said thermal switch comprises a bi-metal material.

14. The assembly as recited in claim 11 wherein said temperature control assembly comprises a timer.

15. The assembly as recited in claim 11 wherein said temperature control assembly comprises at least one indicator.

* * * * *